(12) United States Patent  
Park

(10) Patent No.: US 11,523,054 B2
(45) Date of Patent: Dec. 6, 2022

(54) WIDE-ANGLE IMAGE PROVIDING METHOD

(71) Applicant: TENNTWO CO., LTD., Gyeongsangnam-do (KR)

(72) Inventor: Seong Yeul Park, Suwon-Si (KR)

(73) Assignee: TENNTWO CO., LTD., Gyeongsangnam-do (KR)

( * ) Notice: Subject to any disclaimer, the term of this patent is extended or adjusted under 35 U.S.C. 154(b) by 0 days.

(21) Appl. No.: 17/050,461

(22) PCT Filed: Apr. 26, 2019

(86) PCT No.: PCT/KR2019/005074
§ 371 (c)(1),
(2) Date: Oct. 26, 2020

(87) PCT Pub. No.: WO2019/209069
PCT Pub. Date: Oct. 31, 2019

(65) Prior Publication Data
US 2021/0243368 A1 Aug. 5, 2021

(30) Foreign Application Priority Data

Apr. 26, 2018 (KR) ........................ 10-2018-0048326
Apr. 26, 2018 (KR) ........................ 10-2018-0048327
Apr. 26, 2018 (KR) ........................ 10-2018-0048328

(51) Int. Cl.
*H04N 5/232* (2006.01)
*G06T 7/80* (2017.01)
(Continued)

(52) U.S. Cl.
CPC ......... *H04N 5/23232* (2013.01); *G06T 5/006* (2013.01); *G06T 5/50* (2013.01);
(Continued)

(58) Field of Classification Search
None
See application file for complete search history.

(56) References Cited

U.S. PATENT DOCUMENTS

2011/0134262 A1    6/2011  Ogasahara
2013/0208081 A1*   8/2013  Xiong ....................... G06T 3/60
                                                        348/36
(Continued)

FOREIGN PATENT DOCUMENTS

JP    2011-120138 A    6/2011
JP        6022123 B1   11/2016
(Continued)

OTHER PUBLICATIONS

International Search Report for PCT/KR2019/005074 dated Sep. 3, 2019 from Korean Intellectual Property Office.

*Primary Examiner* — Quan Pham
(74) *Attorney, Agent, or Firm* — Revolution IP, PLLC

(57) ABSTRACT

The present invention relates to a wide-angle image providing method including: an image taking step of generating a first region image obtained by taking an image of a first region and generating a second region image obtained by taking an image of a second region adjacent to the first region by a second camera module; a distortion calibration step of correcting distortion of each of the first and second region images by a distortion calibration unit; a phase difference calibration step of correcting a phase difference of each of the first and second region images; an overlap calibration step of correcting the first and second region images while overlapping the first and second region images to be adjacent to each other by an overlap calibration unit; and a color calibration step of correcting colors of the first and second region images which have been overlapped and calibrated.

6 Claims, 33 Drawing Sheets

(51) Int. Cl.
*G06T 5/00* (2006.01)
*G06T 5/50* (2006.01)
*H04N 5/225* (2006.01)
*H04N 9/68* (2006.01)

(52) U.S. Cl.
CPC ............ *G06T 7/80* (2017.01); *H04N 5/2252* (2013.01); *H04N 5/2258* (2013.01); *H04N 5/23238* (2013.01); *H04N 9/68* (2013.01)

(56) References Cited

U.S. PATENT DOCUMENTS

| | | | |
|---|---|---|---|
| 2014/0300687 A1* | 10/2014 | Gillard | H04N 5/2628 348/36 |
| 2015/0373266 A1* | 12/2015 | Hsieh | H04N 5/2252 348/36 |
| 2016/0286137 A1* | 9/2016 | Marks | H04N 5/23238 |
| 2016/0360104 A1* | 12/2016 | Zhang | H04N 13/239 |
| 2017/0061686 A1* | 3/2017 | Yu | H04N 5/23254 |
| 2018/0278914 A1 | 9/2018 | Kato | |
| 2021/0243367 A1* | 8/2021 | Park | H04N 7/183 |

FOREIGN PATENT DOCUMENTS

| | | |
|---|---|---|
| KR | 10-2006-0044129 A | 5/2006 |
| KR | 10-1657673 B1 | 9/2016 |
| KR | 10-2017-0053256 A | 5/2017 |

\* cited by examiner (a)

(b)

WIDE-ANGLE IMAGE PROVIDING METHOD

TECHNICAL FIELD

An embodiment of the present invention relates to a method of providing a wide-angle image.

BACKGROUND ART

In general, a CCTV camera is used for security purposes of general homes or is installed to prevent trespassing, robbery or a fire at places, such as a department, a bank and an exhibition hall, and to rapidly process an accident although the accident occurs.

In particular, such a CCTV camera system is installed at a specific place for a special purpose and is used for the purpose of monitoring an image at a remote place in order to monitor all situations. In general, the CCTV camera is installed at the top of a wall surface or the ceiling of a building so that as wide an area as possible can be monitored and set toward a specific direction.

However, in general, a camera used for CCTV as described above has a view angle in the range of 30° to 70° and has a blind spot due to a limited photographing range. In order to reduce such a blind spot, the camera uses a wide-angle lens, such as a fish-eye lens.

However, the camera on which the wide-angle lens is mounted has characteristics in that it has a short focal distance and a wide field of view (FOV), compared to a case where a standard lens is used. A form of an image obtained by the camera experiences a thing distortion phenomenon due to radial distortion.

Furthermore, an image captured by a panorama camera according to a conventional technology has a problem in that a location distortion phenomenon occurs.

DISCLOSURE

Technical Problem

The present invention has been made to solve the aforementioned problems. A system for providing a wide-angle image according to the present invention is to provide a wide-angle image not having a blind spot and not having wide-angle distortion, distance distortion, an intensity difference and chromatic aberration, to output an image in a VR form by providing a wide-angle image not having distortion, and to prevent distortion from occurring even when an image is reduced or enlarged.

Furthermore, a system for providing a wide-angle image according to the present invention is to provide a wide-angle image by using various camera modules, such as a camera for a mobile, a camera for CCTV, and a web camera, and through calibration using a dedicated program or a dedicated mobile application.

Furthermore, a system for providing a wide-angle image according to the present invention is to provide a method and system for providing a wide-angle image, which may be applied to all industries in which a camera is used, such as a vehicle, a drone, a mobile, a camera, a ship, a rocket, medical treatment, national defense, homes, and leisure.

Technical Solution

A method of providing a wide-angle image according to an embodiment of the present invention according to the present embodiment for solving the aforementioned problems includes a photographing step of generating, by a first camera module, a first area image of a first area and generating, by a second camera module, a second area image of a second area neighboring the first area; a distortion calibration step of calibrating, by a distortion calibration unit, distortion of each of the first and second area images; a phase difference calibration step of calibrating, by a phase difference calibration unit, a phase difference between the first and second area images whose distortion has been calibrated; an overlap calibration step of calibrating, by an overlap calibration unit, the first and second area images whose phases have been calibrated in an overlap manner so that the first and second area images neighbor each other; and a color calibration step of calibrating, by a color calibration unit, a color of the superimposed and calibrated first and second images.

According to another embodiment of the present invention, the distortion calibration step may include calibrating, by the distortion calibration unit, wide-angle distortion of each of the first and second area images and then calibrating distance distortion. The phase difference calibration step may include extracting, by the phase difference calibration unit, a horizontal reference point of the first and second area images and then adjusting locations of the first and second area images by rotating and moving coordinates. The overlap calibration step may include adjusting, by the overlap calibration unit, a size of each of the first and second area images and then adjusting locations of the first and second area images so that the first and second area images are superimposed by moving the coordinates. The color calibration step may include calibrating, by the color calibration unit, brightness and chromatic aberration of the superimposed and calibrated overlap image.

According to another embodiment of the present invention, the photographing step may include generating the first and second area images by disposing photographing faces of the first camera module and the second camera module at an angle of 110° to 135°.

Furthermore, a method of providing a wide-angle image according to another embodiment of the present invention includes a photographing step of generating, by a first camera module, a first area image of a first area, generating, by a second camera module, a second area image of a second area neighboring a right of the first area, generating, by a third camera module, a third area image of a third area neighboring a lower side of the first area, and generating, by a fourth camera module, a fourth area image of a fourth area neighboring a lower side of the second area and a right of the third area; a distortion calibration step of calibrating, by a distortion calibration unit, distortion of each of the first, second, third and fourth area images; a phase difference calibration step of calibrating, by a phase difference calibration unit, a phase difference of each of the first, second, third and fourth area images whose distortion has been calibrated; an overlap calibration step of calibrating, by an overlap calibration unit, the first, second, third and fourth area images whose phases have been calibrated in an overlap manner so that the first, second, third and fourth area images neighbor each other; and a color calibration step of calibrating, by a color calibration unit, a color of the superimposed and calibrated overlap image.

According to another embodiment of the present invention, the distortion calibration step may include calibrating, by the distortion calibration unit, wide-angle distortion of each of the first, second, third and fourth area images and then calibrating distance distortion. The phase difference calibration step may include extracting, by the phase difference calibration unit, a horizontal reference point of the first, second, third and fourth area images and then adjusting locations of the first, second, third and fourth area images by rotating and moving coordinates. The overlap calibration step may include adjusting, by the overlap calibration unit, a size of each of the first, second, third and fourth area images and then adjusting locations of the first, second, third and fourth area images so that the first, second, third and fourth area images are superimposed by moving the coordinates. The color calibration step may include adjusting, by the color calibration unit, brightness and chromatic aberration of the superimposed and calibrated overlap image.

According to another embodiment of the present invention, the photographing step may further include the step of adjusting an angle formed between the first, second, third and fourth camera modules.

Furthermore, a method of providing a wide-angle image according to another embodiment of the present invention includes a photographing step of generating, by a first camera module, a first area image of a first area, generating, by a second camera module, a second area image of a second area neighboring a right of the first area, generating, by a third camera module, a third area image of a third area which is an opposite side of the first area, and generating, by a fourth camera module, a fourth area image of a fourth area which is an opposite side of the second area and neighbors a left of the third area; a distortion calibration step of calibrating, by a distortion calibration unit, distortion of each of the first, second, third and fourth area images; a phase difference calibration step of calibrating, by a phase difference calibration unit, a phase difference of each of the first, second, third and fourth area images whose distortion has been calibrated; an overlap calibration step of calibrating, by an overlap calibration unit, the first, second, third and fourth area images whose phases have been calibrated in an overlap manner so that the first, second, third and fourth area images neighbor each other; and a color calibration step of calibrating, by a color calibration unit, a color of the superimposed and calibrated overlap image.

According to another embodiment of the present invention, the distortion calibration step may include calibrating, by the distortion calibration unit, wide-angle distortion of each of the first, second, third and fourth area images and then calibrating distance distortion. The phase difference calibration step may include extracting, by the phase difference calibration unit, a horizontal reference point of the first, second, third and fourth area images and then adjusting locations of the first, second, third and fourth area images by rotating and moving coordinates. The overlap calibration step may include adjusting, by the overlap calibration unit, a size of each of the first, second, third and fourth area images and then adjusting locations of the first, second, third and fourth area images so that the first, second, third and fourth area images are superimposed by moving the coordinates. The color calibration step may include adjusting, by the color calibration unit, brightness and chromatic aberration of the superimposed and calibrated overlap image.

According to another embodiment of the present invention, the photographing step may further include the steps of adjusting an angle formed by the first and second camera modules; and adjusting an angle formed by the third and fourth camera modules.

Advantageous Effects

According to an embodiment of the present invention, a wide-angle image not having a blind spot and not having wide-angle distortion, distance distortion, an intensity difference and chromatic aberration can be provided.

Furthermore, according to an embodiment of the present invention, an image can be output in a VR form by providing a wide-angle image not having distortion, and distortion does not occur even when an image is reduced or enlarged.

Furthermore, according to an embodiment of the present invention, a wide-angle image can be provided using various camera modules, such as a camera for a mobile, a camera for CCTV, and a web camera, and through calibration using a dedicated program or a dedicated mobile application.

Moreover, according to an embodiment of the present invention, an image having a wide view angle can be provided, which is applied to all industries in which a camera is used, such as a vehicle, a drone, a mobile, a camera, a ship, a rocket, medical treatment, national defense, homes, and leisure.

MODE FOR INVENTION

Figure 1:
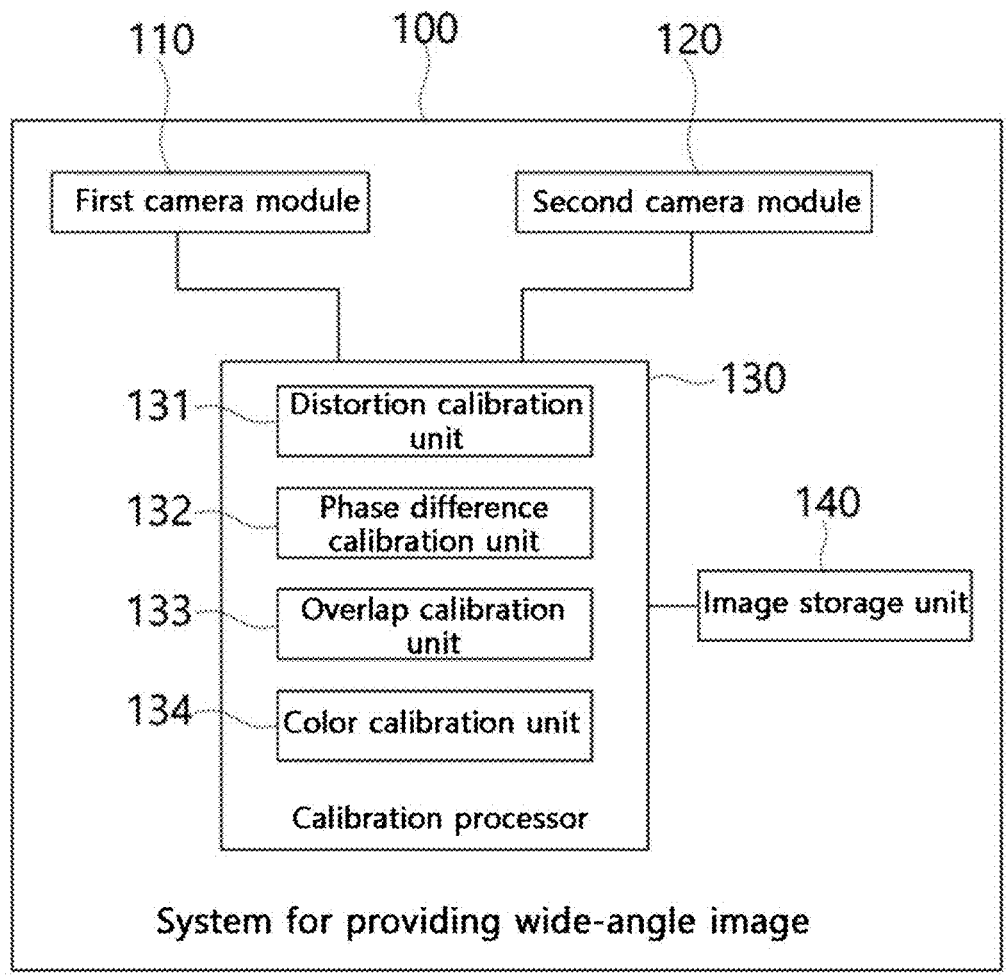
FIG. 1 shows a configuration of a system for providing a wide-angle image according to an embodiment of the present invention.

Hereinafter, embodiments of the present invention are described in detail with reference to the accompanying drawings. However, in describing the embodiments, a detailed description of the known function or element related to the present invention will be omitted if it is deemed to make the gist of the present invention unnecessarily vague. Furthermore, it is to be noted that in the drawings, the size of each element may have been exaggerated and does not correspond to an actual size.

FIG. 1 shows a configuration of a system for providing a wide-angle image according to an embodiment of the present invention. Hereinafter, the configuration of the system for providing a wide-angle image according to an embodiment of the present invention is described with reference to FIG. 1.

As shown FIG. 1, the system for providing a wide-angle image according to an embodiment of the present invention may be configured to include a first camera module 110, a second camera module 120, calibration processor 130 and an image storage unit 140. Furthermore, the calibration processor 130 may be configured to include a distortion calibration unit 131, a phase difference calibration unit 132, an overlap calibration unit 133 and a color calibration unit 134.

The first camera module 110 generates a first area image of a first area. The second camera module 120 generates a second area image of a second area neighboring the first area.

More specifically, the first camera module 110 may generate a first area image, that is, a left image, by photographing an area corresponding to the left of an area to be photographed. The second camera module 120 may generate a second area image, that is, a right image, by photographing an area corresponding to the right of an area to be photographed.

In this case, each of the photographing faces of the first camera module 110 and the second camera module 120 is disposed at an angle of 110° to 135°. Images photographed by the first camera module 110 and the second camera module 120 may provide images having view angles of left and right 180° to 200° and up and down 90° to 110°, respectively.

Images photographed by the first and second cameras 110 and 120 as described above may include wide-angle distortion and distance distortion. If images photographed using two cameras are overlapped to neighbor each other, a phase difference, an overlap area, an intensity difference or chromatic aberration occurs.

Accordingly, as described above, the calibration processor 130 calibrates distortion, a phase difference, an overlap area, an intensity difference or chromatic aberration of an image. That is, the calibration processor 130 performs a distortion calibration and a phase difference calibration on the first and second area images photographed by the first and second cameras 110 and 120, and performs an overlap calibration and a color calibration on the first and second area images whose phase differences have been calibrated.

More specifically, the calibration processor 130 may be configured to include the distortion calibration unit 131, the phase difference calibration unit 132, the overlap calibration unit 133 and the color calibration unit 134.

The distortion calibration unit 131 may calibrate distortion of the first area image photographed by the first camera module 110. The phase difference calibration unit 132 may perform a phase difference calibration on each of the first and second area images whose distortion has been calibrated. Furthermore, the overlap calibration unit 133 may calibrate the first and second area images, each one having its phase calibrated, in an overlap manner so that the first and second area images neighbor each other. The color calibration unit 134 may perform a color calibration on the superimposed and calibrated overlap images.

This is more specifically described. The distortion calibration unit 131 may perform a wide-angle distortion calibration on each of the first and second area images, and may then calibrate distance distortion. The phase difference calibration unit 132 may extract the horizontal reference point of the first and second area images, and may then adjust the locations of the first and second area images by rotating and moving coordinates. The overlap calibration unit 133 may adjust the size of each of the first and second area images, and may then adjust the locations of the first and second area images so that they overlap each other by moving the coordinates. The color calibration unit 134 may adjust brightness and chromatic aberration of the superimposed and calibrated overlap images.

The image storage unit 140 may store the images calibrated and composed by the calibration processor 130 as described above.

Accordingly, according to an embodiment of the present invention, a wide-angle image not having a blind spot and not having wide-angle distortion, distance distortion, an intensity difference and chromatic aberration can be provided.

Figure 2:
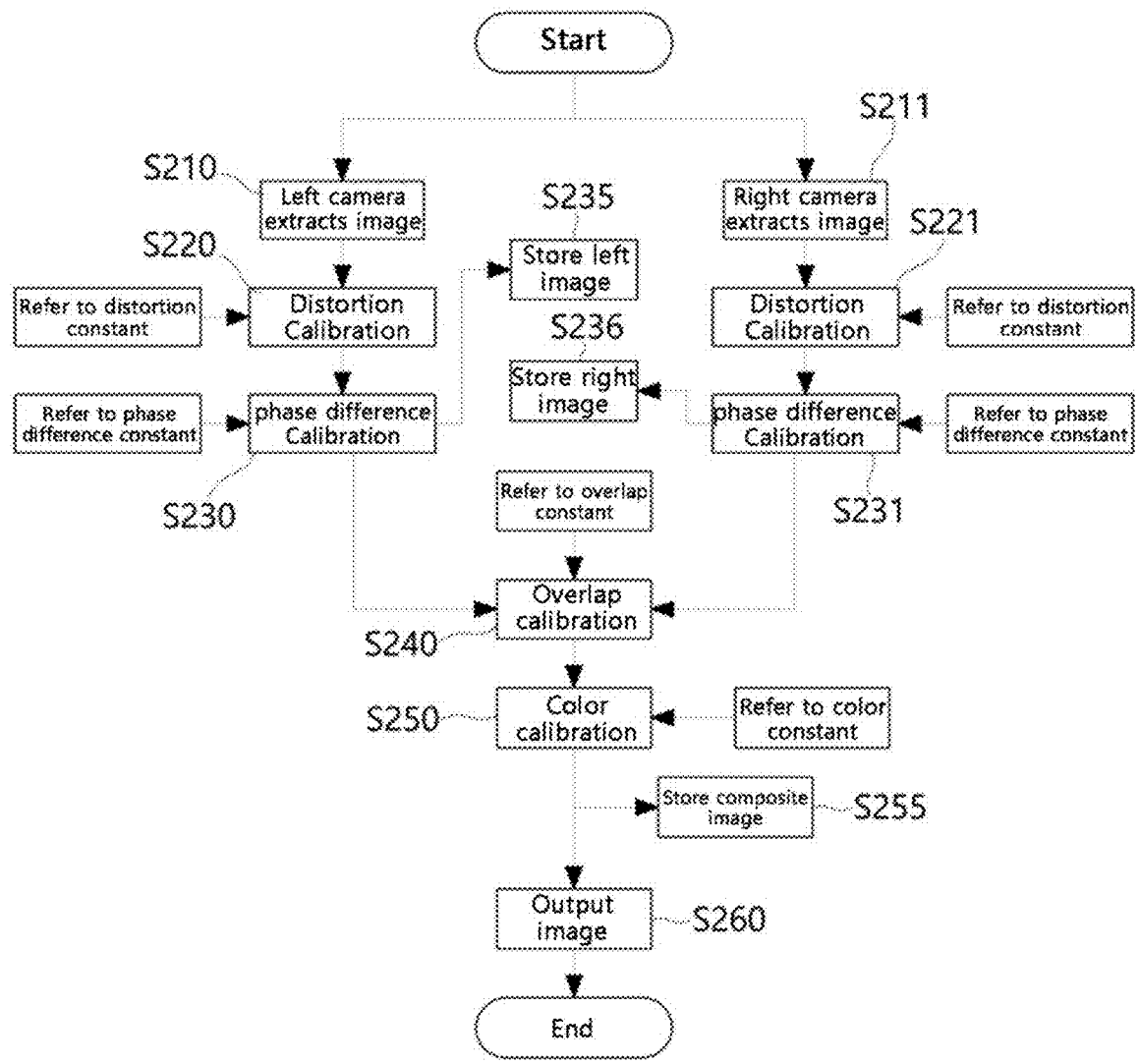
FIG. 2 is a flowchart for describing a method of providing a wide-angle image according to an embodiment of the present invention.
Figure 3:
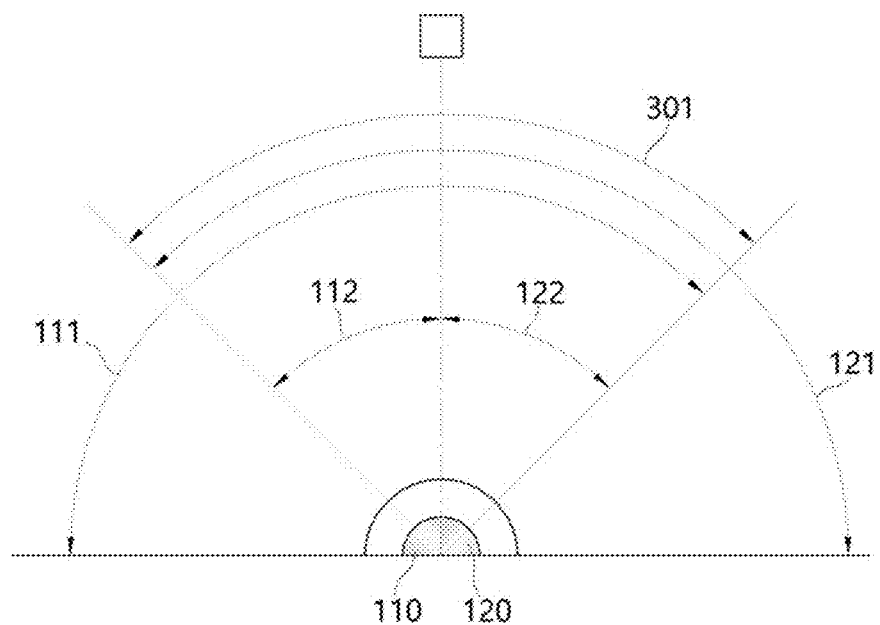
FIG. 3 is a diagram for describing the photographing areas of first and second cameras according to an embodiment of the present invention.

FIG. 2 is a flowchart for describing a method of providing a wide-angle image according to an embodiment of the present invention. FIG. 3 is a diagram for describing the photographing areas of first and second cameras according to an embodiment of the present invention.

Furthermore, FIGS. 4 to 8 are diagrams for describing a process of calibrating first and second area images, for describing a method of providing a wide-angle image according to an embodiment of the present invention.

Hereinafter, the method of providing a wide-angle image according to an embodiment of the present invention is described with reference to FIGS. 2 to 8.

First, as shown in FIG. 2, the first camera module corresponding to a left camera generates and extracts a first area image of a first area (S210). The second camera module corresponding to a right camera generates and extracts a second area image of a second area neighboring the first area (S211).

The first and second area images extracted as described above include distance distortion and wide-angle distortion. Accordingly, the distortion calibration unit calibrates wide-angle distortion and distance distortion of each of the first and second area images with reference to a distortion constant (S220, S221).

Figure 4:
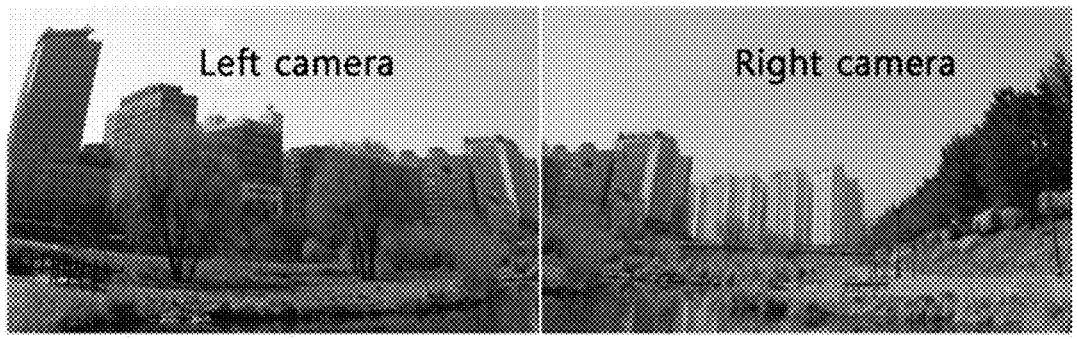
FIGS. 4 to 8 are diagrams for describing a process of calibrating first and second area images, for describing a method of providing a wide-angle image according to an embodiment of the present invention.

FIG. 4 shows the first and second area images whose wide-angle distortion and distance distortion have been calibrated as described above.

Figure 5:
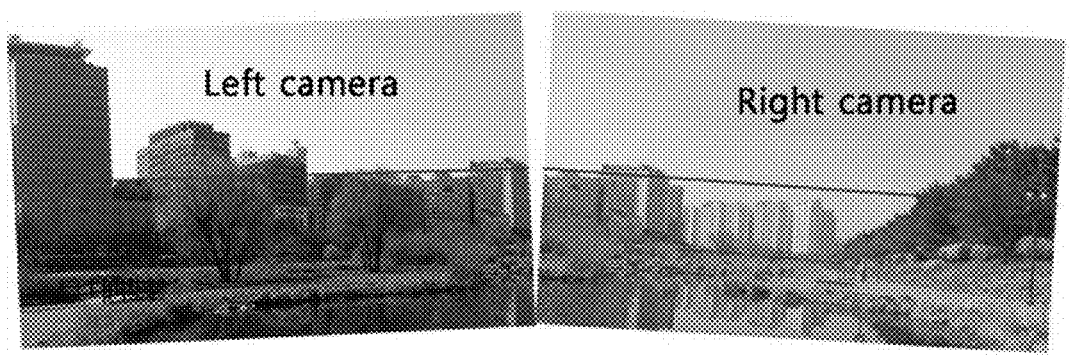

Thereafter, the phase difference calibration unit extracts the horizontal reference point of the first and second area images whose wide-angle distortion and distance distortion have been calibrated with reference to a phase difference constant, adjusts the locations of the first and second area images by rotating and moving coordinates as in FIG. 5 (S230, S231), and stores the first and second area images whose coordinates have been rotated and moved and whose locations have been adjusted (S235, S236).

Figure 6:
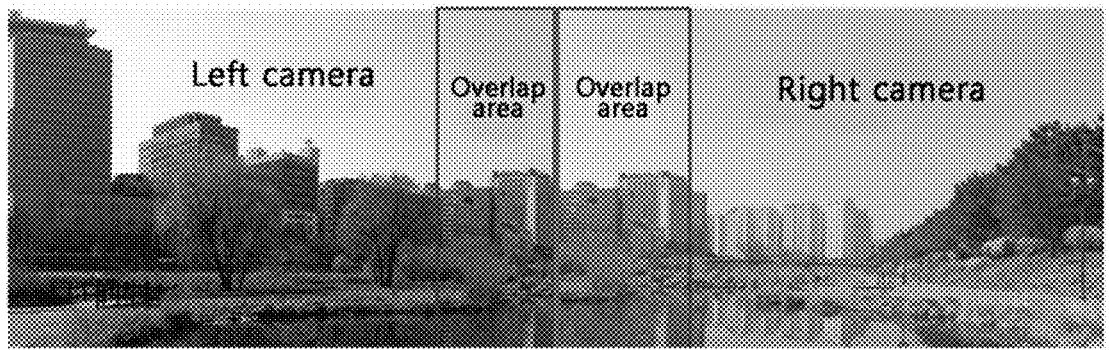

Thereafter, the overlap calibration unit adjusts the sizes of the stored first and second area images with reference to an overlap constant, and then adjusts the locations of the first and second area images so that the locations overlap by moving the coordinates as in FIG. 6 (S240).

Referring to FIG. 3, the images whose locations have been adjusted and overlapped are composed of the first area image 111 of the first area photographed by the first camera module 110 and the second area image 121 of the second area photographed by the second camera module 120. An area 301 overlapped between the first area and the second area occurs. The overlapped area 301 is divided into a first camera module calibration area 112 and a second camera module calibration area 122.

Figure 7:
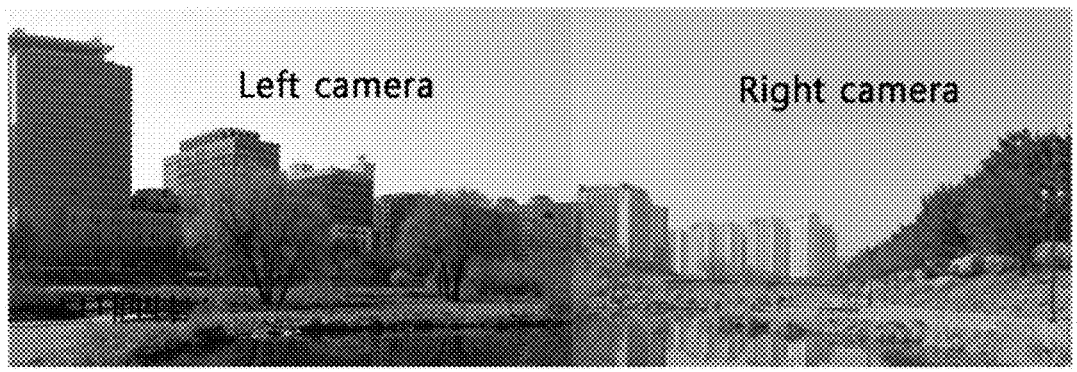
Figure 8:

As shown in FIG. 7, the color calibration unit generates and stores an image in which the first and second area images are overlapped and composed as in FIG. 8 by adjusting brightness and chromatic aberration of the superimposed and calibrated overlap image with reference to a color constant (S250, S255), and may output the composite image stored as described above (S260).

Figure 9:
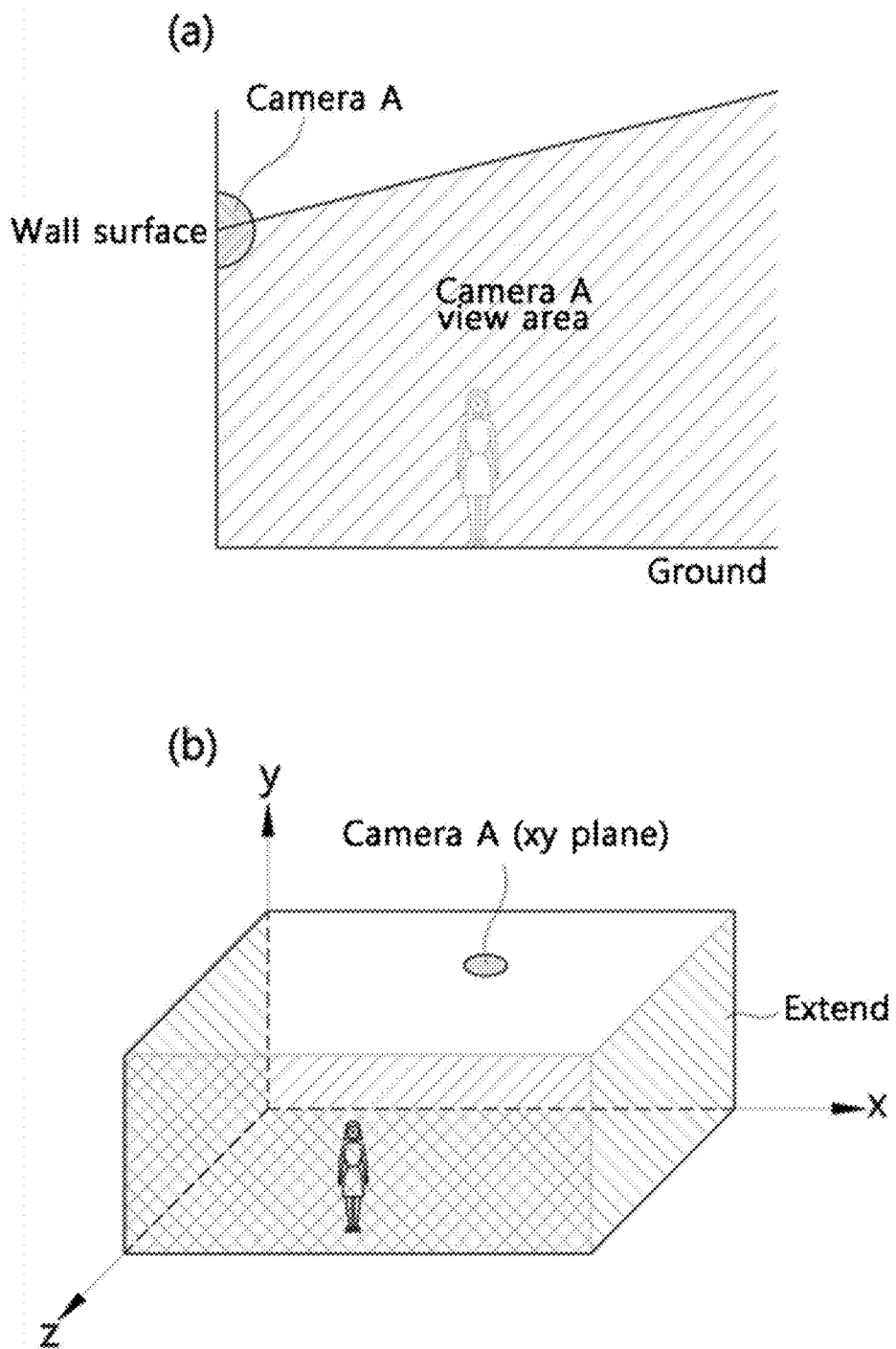
FIGS. 9 and 10 are diagrams showing locations where first and second cameras are disposed according to an embodiment of the present invention.
Figure 10:
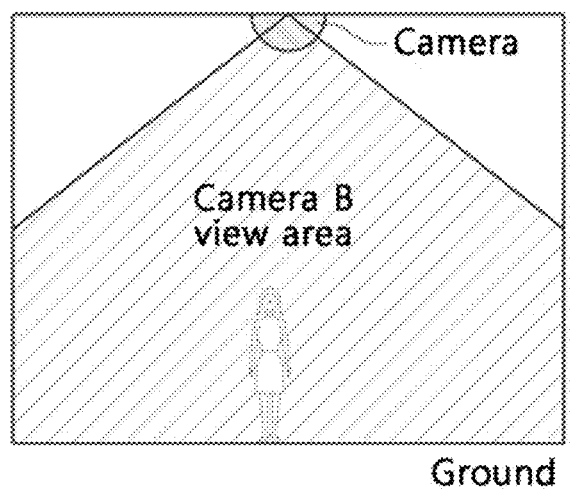
Figure 10:
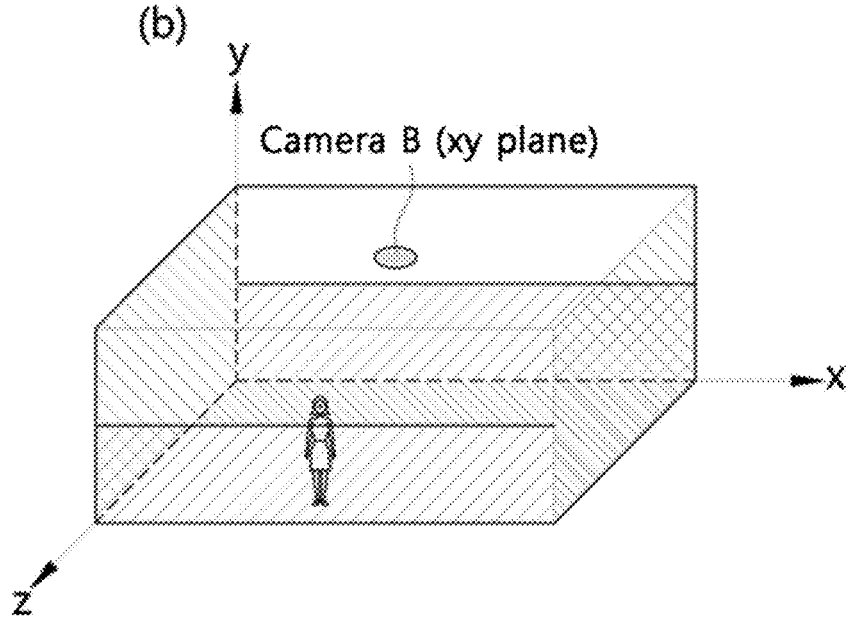
Figure 11:
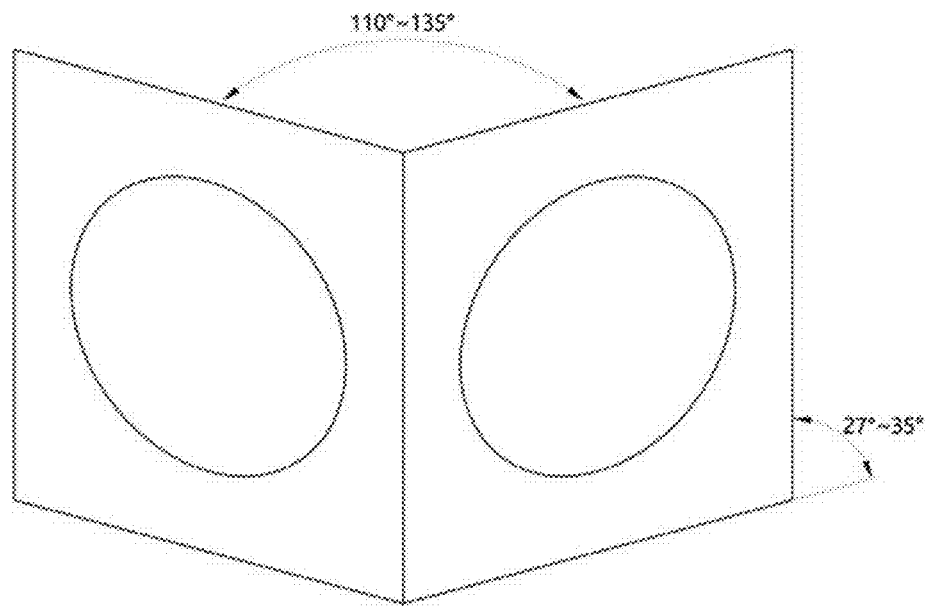
FIGS. 11 and 12 are diagrams showing photographing deployment angles of the first and second cameras according to locations where the first and second cameras are disposed according to an embodiment of the present invention.
Figure 12:
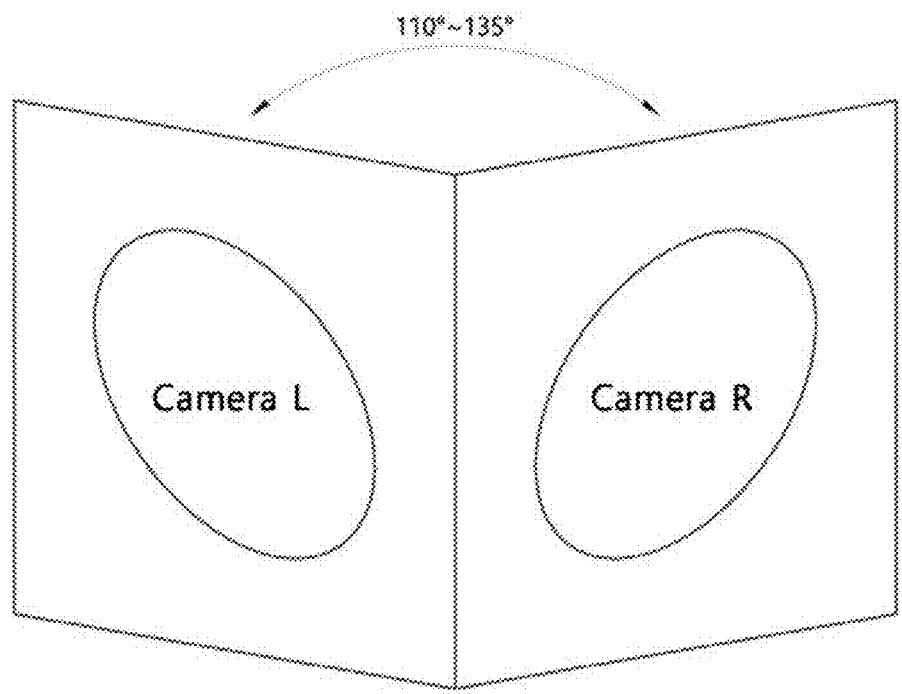

FIGS. 9 and 10 are diagrams showing locations where first and second cameras are disposed according to an embodiment of the present invention. FIGS. 11 and 12 are diagrams showing photographing deployment angles of the first and second cameras according to locations where the first and second cameras are disposed according to an embodiment of the present invention.

Figure 13:
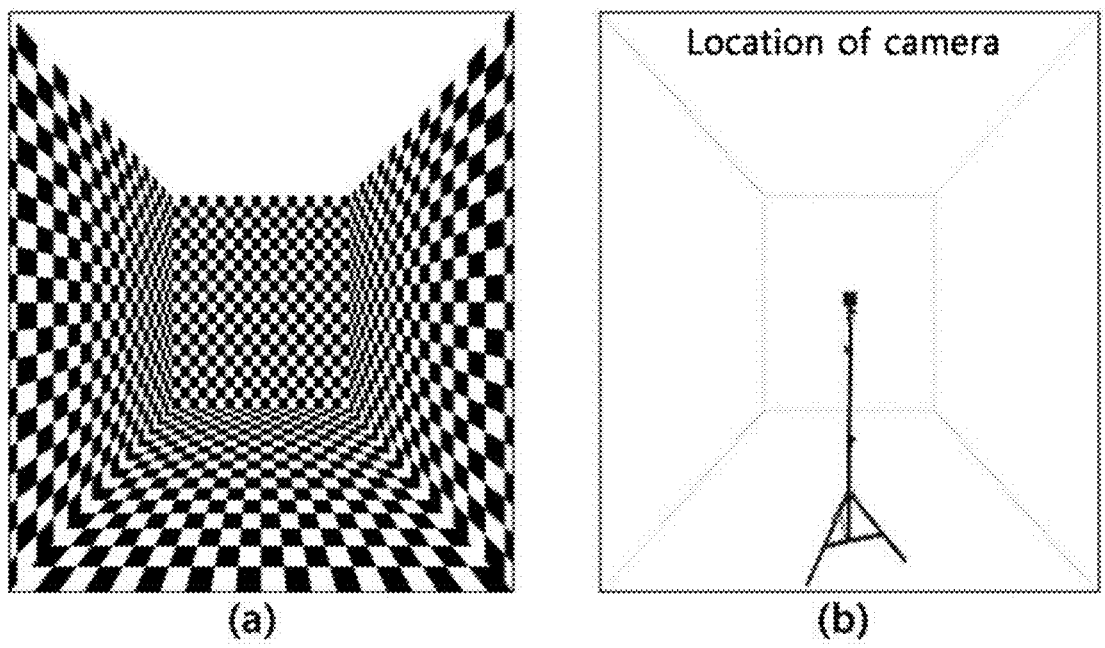
FIGS. 13 to 15 are diagrams showing calibration booths for the calibration of a method of providing a wide-angle image according to an embodiment of the present invention.
Figure 14:
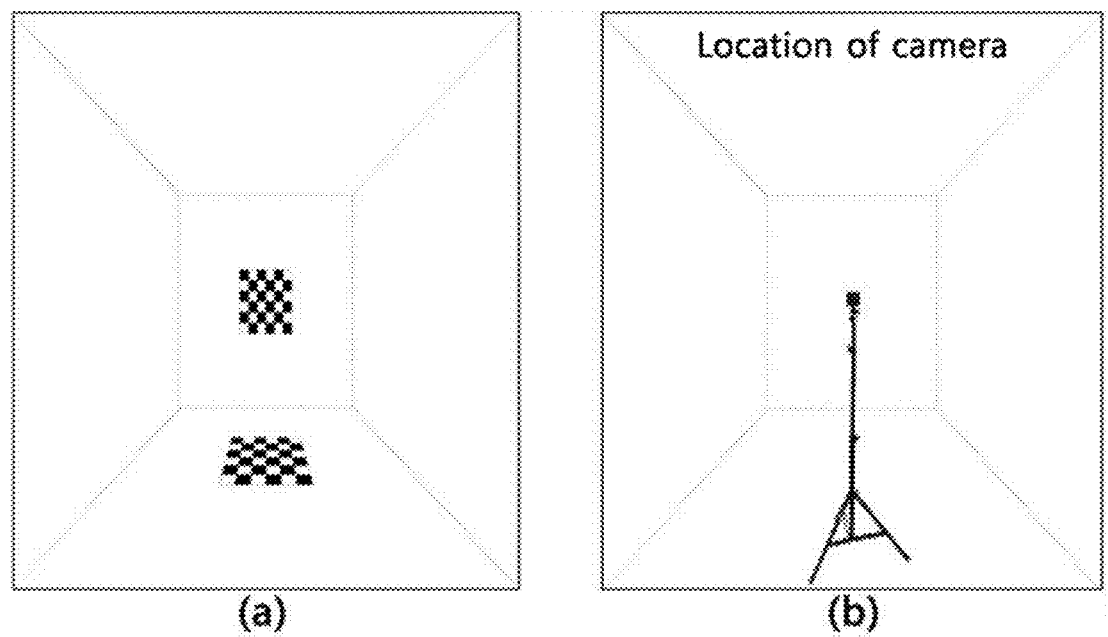
Figure 15:
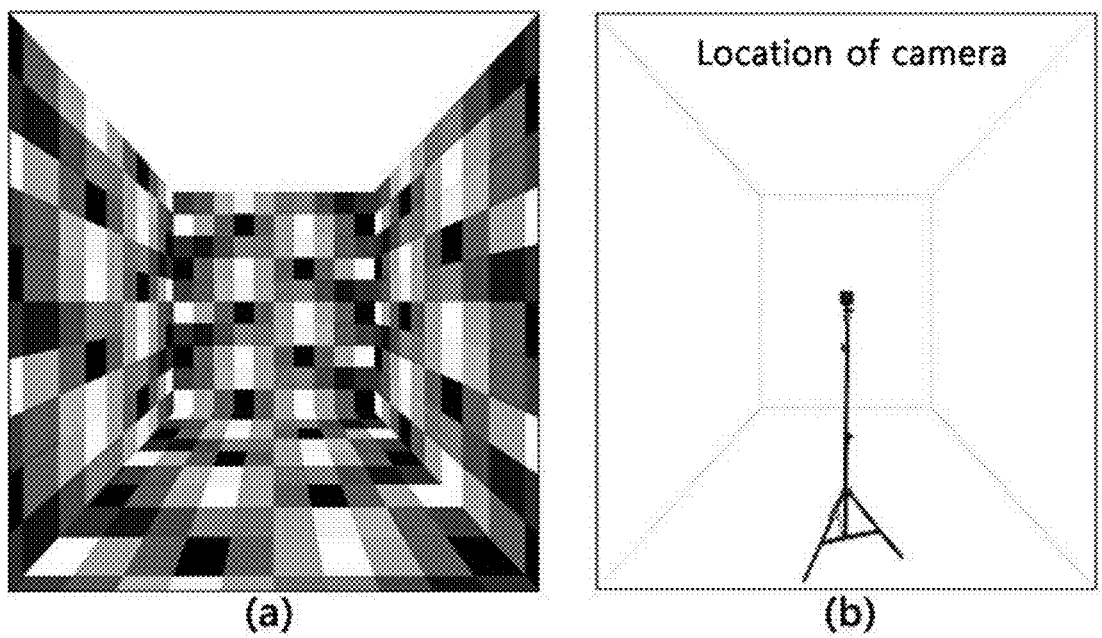

Furthermore, FIGS. 13 to 15 are diagrams showing calibration booths for the calibration of a method of providing a wide-angle image according to an embodiment of the present invention.

Hereinafter, photographing angles of the first and second cameras according to the deployment of the first and second cameras according to an embodiment of the present invention are described with reference to FIGS. 9 to 12.

If the first and second cameras are disposed on the side vertically upright from the ground, such as a wall surface, as in FIG. 9, the photographing faces of the first and second cameras may be disposed at an angle of 110° to 135°, and the first and second cameras and the wall surface may be disposed to form an angle of 27° to 35° as in FIG. 11. Accordingly, an image of areas other than the corresponding side (wall surface) may be provided.

Furthermore, if the first and second cameras are disposed toward the ground, such as a place such as a ceiling, as in FIG. 10, the photographing faces of the first and second cameras may be disposed at an angle of 110° to 135° as in FIG. 12. Accordingly, an image of all faces on both sides and an image of the remaining some faces on both sides may be provided.

FIG. 13 shows a calibration booth for calibrating wide-angle distortion and distance distortion according to an embodiment of the present invention. FIG. 14 shows a calibration booth for calibrating an overlap image according to an embodiment of the present invention.

Furthermore, FIG. 15 shows a calibration booth for calibrating brightness and chromatic aberration of an area image according to an embodiment of the present invention.

Accordingly, according to an embodiment of the present invention, a wide-angle image not having a blind spot and not having wide-angle distortion, distance distortion, an intensity difference and chromatic aberration can be provided. An image can be output in a VR form by providing a wide-angle image not having distortion. Distortion does not occur even when an image is reduced or enlarged.

Moreover, according to an embodiment of the present invention, an image having a wide view angle can be provided by applying the image to all industries in which a camera is used, such as a vehicle, a drone, a mobile, the camera, a ship, a rocket, medical treatment, national defense, homes, and leisure.

Figure 16:
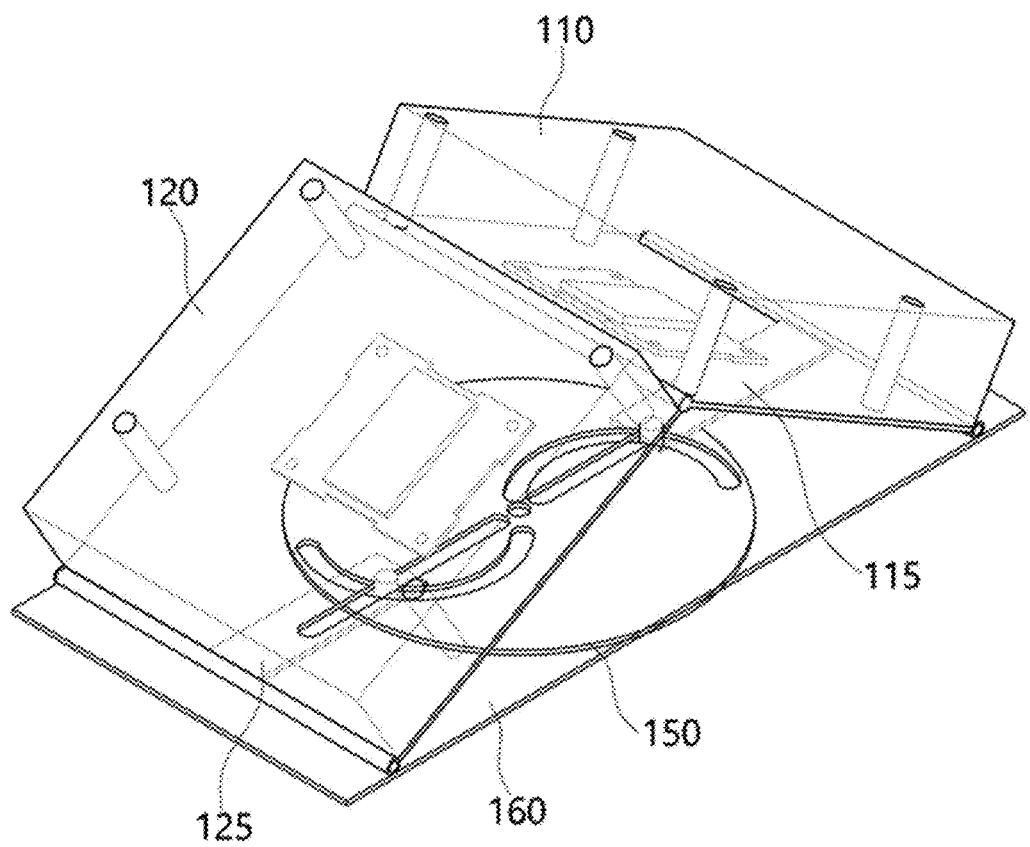
FIG. 16 is a perspective view of a camera module of the system for providing a wide-angle image according to an embodiment of the present invention.
Figure 17:
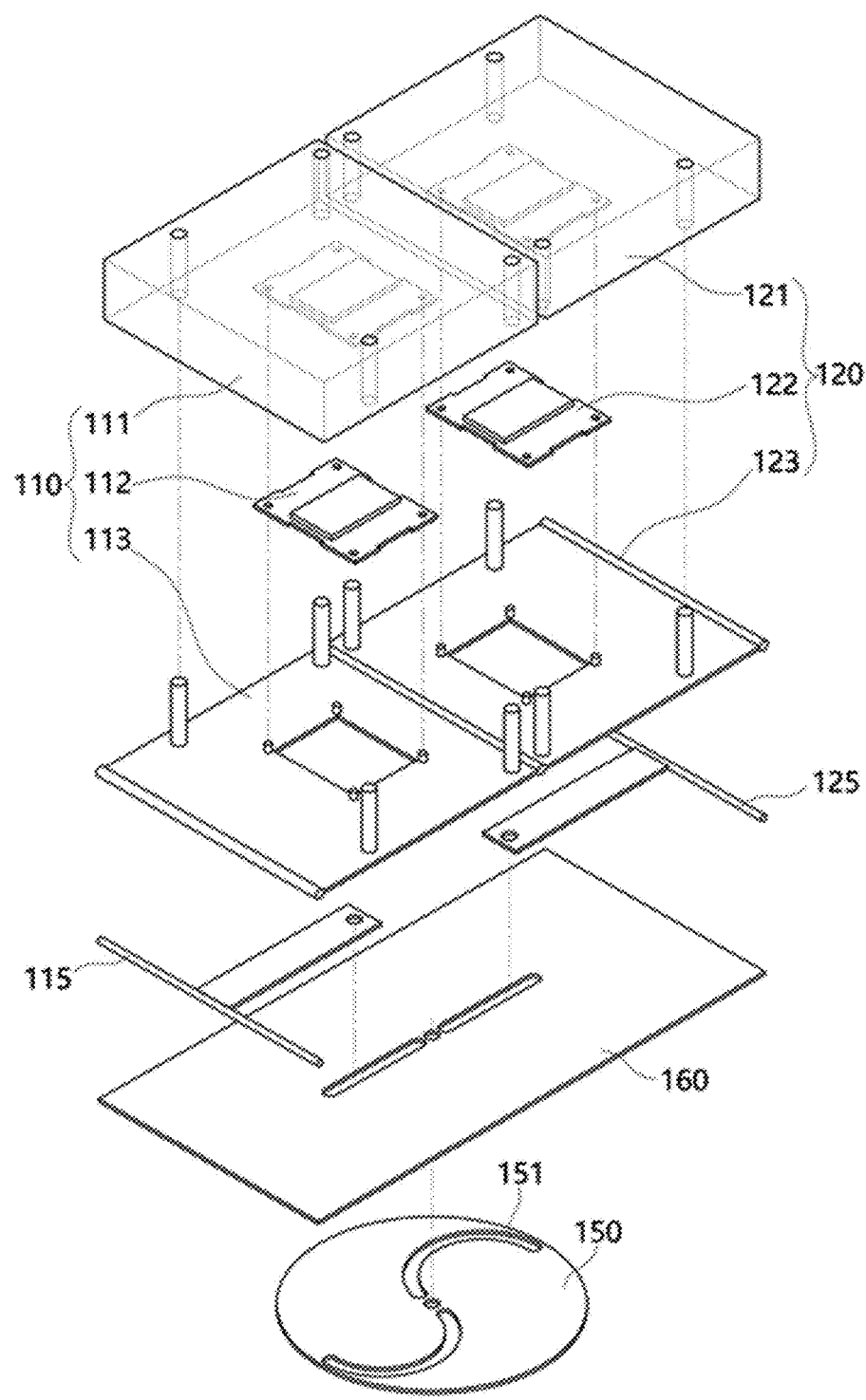
FIG. 17 is a development figure of the camera module of the system for providing a wide-angle image according to an embodiment of the present invention.
Figure 18:
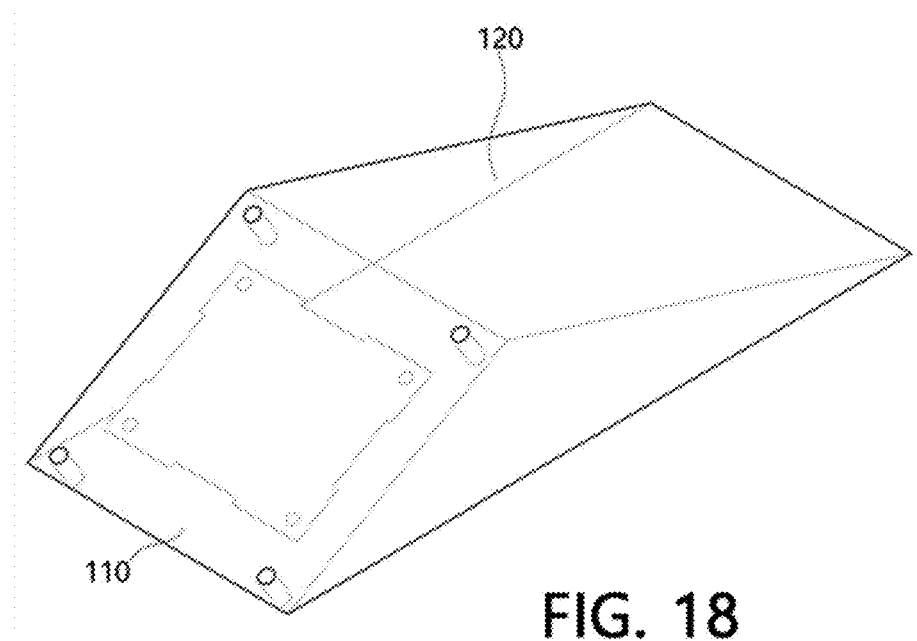
FIG. 18 is a diagram for describing a method of adjusting the deployment and angle of the camera module of the system for providing a wide-angle image according to an embodiment of the present invention.

FIG. 16 is a perspective view of a camera module of the system for providing a wide-angle image according to an embodiment of the present invention. FIG. 17 is a development figure of the camera module of the system for providing a wide-angle image according to an embodiment of the present invention. FIG. 18 is a diagram for describing a method of adjusting the deployment and angle of the camera module of the system for providing a wide-angle image according to an embodiment of the present invention.

Referring to FIGS. 16 and 17, the first camera module 110 according to an embodiment of the present invention is configured to include a first lens module 111, a first image sensor module 112 and a first structure 113.

The first image sensor module 112 generates a first area image of a first area photographed through the first lens module 111. The first structure 113 may be configured to receive the first lens module 111 and the first image sensor module 112.

Likewise, the second camera module 120 is configured to include a second lens module 121, a second image sensor module 122 and a second structure 123. The second image sensor module 122 generates a second area image of a second area photographed through the second lens module 121. The second structure 123 may be configured to receive the second lens module 121 and the first image sensor module 122.

In this case, the first and second structures 113 and 123 may be configured using aluminum frames in order to reduce weight.

Furthermore, each of first and second link units 115 and 125 is coupled to one side of each of the first and second camera modules 110 and 120. A circular plate 150 is fixed to a fixing plate 160 and rotated by a motor. The circular plate 150 may be configured to include curve grooves 151 in which the first and second link units 115 and 125 are coupled and moved, respectively.

Accordingly, the first and second camera modules 110 and 120 each are configured to have the other side, facing the one side, mutually coupled by hinges. The first and second link units 115 and 125 may adjust an angle formed by the first and second camera modules 110 and 120 by moving the curve grooves 151 by the rotation of the circular plate 150.

When the angle between the first and second camera modules 110 and 120 is adjusted, the angle between the first and second camera modules 110 and 120 may be adjusted by rotating the circular plate 150 through control of the motor, and an optimum image photographing angle can be obtained through zoom-in and zoom-out.

Referring to FIG. 18, an angle of the first and second camera modules 110 and 120 may be determined based on a view angle of the first and second camera modules 110 and 120.

$$\alpha = (180° - a) \times (\tfrac{2}{3}) \qquad \text{[Equation 1]}$$

(In this case, α is an angle formed by each of the first and second camera modules and a floor surface, and a is a horizontal view angle of the first and second camera modules)

$$\beta = (180° - b) \times (\tfrac{1}{3}) \qquad \text{[Equation 2]}$$

(In this case, β is an angle of the image module of each of the first and second camera modules, and b is a vertical view angle of each of the first and second camera modules)

According to an embodiment of the present invention, as shown in FIGS. 16 and 18, when the first and second camera modules 110 and 120 are disposed, an angle formed by each of the first and second camera modules 110 and 120 and the floor surface may be calculated using Equation 1. An angle of each of the image modules 112 and 122 of the first and second camera modules 110 and 120 may be calculated using Equation 2.

Figure 19:
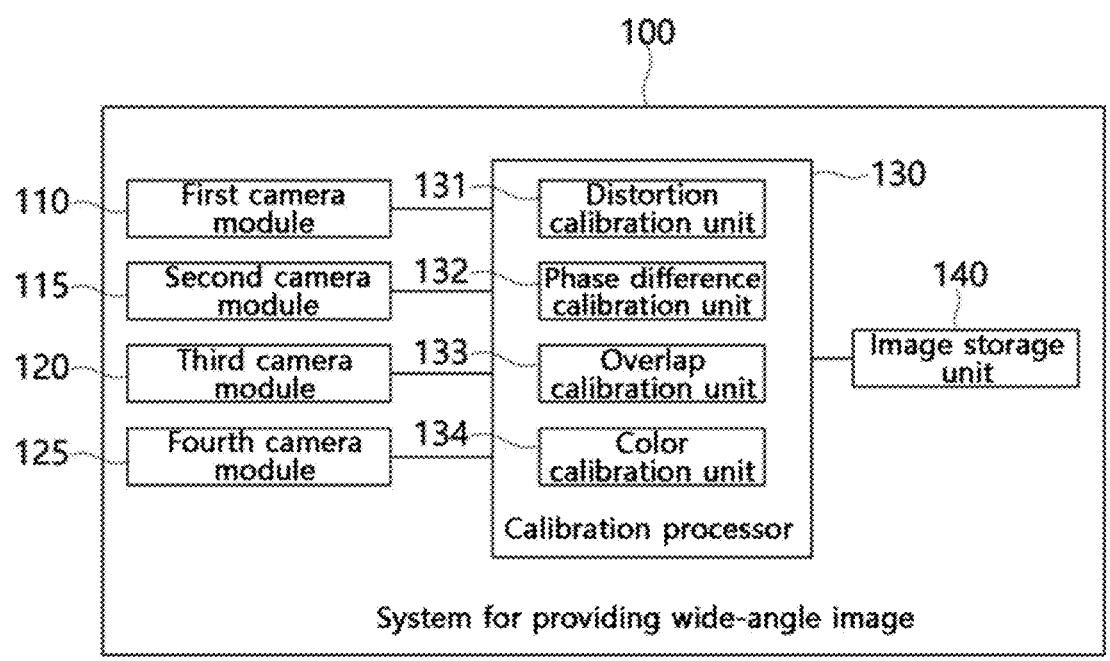
FIG. 19 shows a configuration of a system for providing a wide-angle image according to another embodiment of the present invention.

FIG. 19 shows a configuration of a system for providing a wide-angle image according to another embodiment of the present invention. Hereinafter, the configuration of the system for providing a wide-angle image according to another embodiment of the present invention is described with reference to FIG. 19.

As shown FIG. 19, the system for providing a wide-angle image according to another embodiment of the present invention may be configured to include a first camera module 110, a second camera module 115, a third camera module 120, a fourth camera module 125, a calibration processor 130 and an image storage unit 140. Furthermore, the calibration processor 130 may be configured to include a distortion calibration unit 131, a phase difference calibration unit 132, an overlap calibration unit 133 and a color calibration unit 134.

The first camera module 110 generates a first area image of a first area. The second camera module 115 generates a second area image of a second area that neighbors the right of the first area. The third camera module 120 generates a third area image of a third area that neighbors the lower side of the first area. The fourth camera module 125 generates a fourth area image of a fourth area that neighbors the lower side of the second area and the right of the third area.

More specifically, the first camera module 110 may generate a first area image, that is, an up-left image, by photographing an area corresponding to the up-left of an area to be photographed. The second camera module 115 may generate a second area image, that is, an up-right image, by photographing an area corresponding to the up-right of an area to be photographed. Likewise, the third camera module 120 may generate a third area image, that is, a down-left image, by photographing an area corresponding to the down-left of an area to be photographed. The fourth camera module 125 may generate a fourth area image, that is, a down-right image, by photographing an area corresponding to the down-right of an area to be photographed.

The images photographed by the first, second, third and fourth camera modules 110, 115, 120, and 125 as described above include wide-angle distortion and distance distortion. If images photographed by four cameras are overlapped to neighbor each other, a phase difference, an overlap area, an intensity difference or chromatic aberration occurs.

Accordingly, the calibration processor 130 calibrates distortion, a phase difference, an overlap area, an intensity difference or chromatic aberration of an image as described above. That is, the calibration processor 130 performs distortion calibration and phase difference calibration on each of the first, second, third and fourth area images photographed by the first, second, third and fourth camera modules 110, 115, 120, and 125, and performs overlap calibration and color calibration on the first, second, third and fourth area images whose phase differences have been calibrated.

More specifically, the calibration processor 130 may be configured to include the distortion calibration unit 131, the phase difference calibration unit 132, the overlap calibration unit 133 and the color calibration unit 134.

The distortion calibration unit 131 calibrates the distortion of the first, second, third and fourth area images. The phase difference calibration unit 132 calibrates a phase difference of each of the first, second, third and fourth area images whose distortion has been calibrated. Furthermore, the overlap calibration unit 133 calibrates the first, second, third and fourth area images whose phases have been calibrated in an overlap manner so that they neighbor each other. The color calibration unit 134 may calibrate a color of the superimposed and calibrated overlap image.

This is more specifically described. The distortion calibration unit 131 may calibrate distance distortion after performing wide-angle distortion calibration on each of the first, second, third and fourth area images. The phase difference calibration unit 132 may extract the horizontal reference point of the first, second, third and fourth area images and then adjust the locations of the first, second, third and fourth area images by rotating and moving coordinates. The overlap calibration unit 133 may adjust the size of each of the first, second, third and fourth area images and then adjust the locations of the first, second, third and fourth area images so that they overlap by moving the coordinates. The color calibration unit 134 may adjust brightness and chromatic aberration of the superimposed and calibrated overlap image.

The image storage unit 140 may store an image calibrated and composed by the calibration processor 130 as described above.

Accordingly, according to an embodiment of the present invention, a wide-angle image, not having a blind spot whose view angles are left and right 200° and up and down 200° and not having wide-angle distortion, distance distortion, an intensity difference and chromatic aberration, can be provided.

Figure 20:
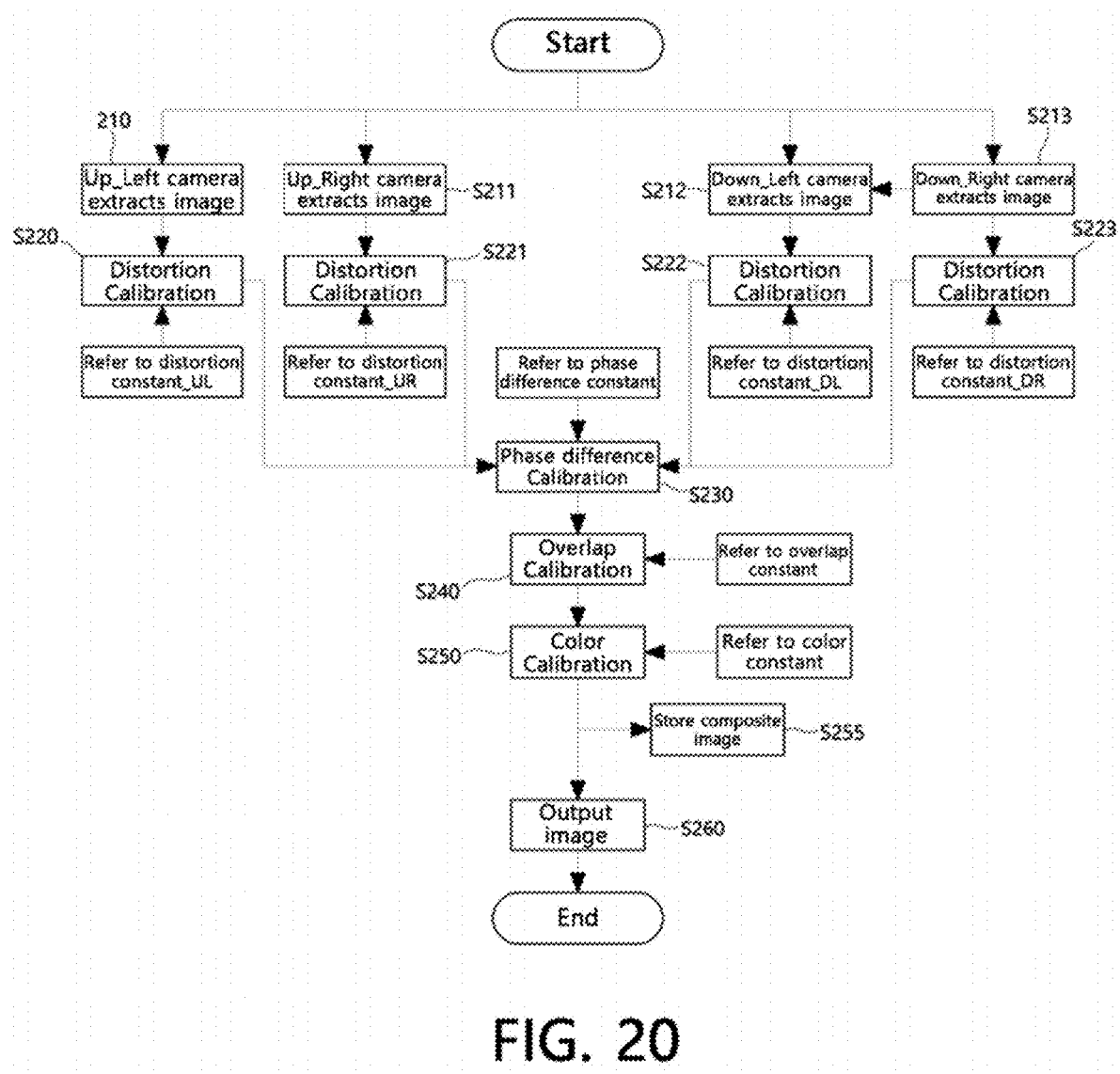
FIG. 20 is a flowchart for describing a method of providing a wide-angle image according to another embodiment of the present invention.

FIG. 20 is a flowchart for describing a method of providing a wide-angle image according to another embodiment of the present invention. FIGS. 21 to 25 are diagrams for describing a process of calibrating first, second, third and fourth area images, for describing the method of providing a wide-angle image according to another embodiment of the present invention.

Hereinafter, the method of providing a wide-angle image according to another embodiment of the present invention is described with reference to FIGS. 20 to 25.

First, as shown in FIG. 20, the first camera module corresponding to an up-left camera generates and extracts a first area image of a first area (S210). The second camera module corresponding to an up-right camera generates and extracts a second area image of a second area neighboring the right of the first area (S211).

Furthermore, the third camera module corresponding to a down-left camera generates and extracts a third area image of a third area (S212). The fourth camera module corresponding to a down-right camera generates and extracts a fourth area image of a fourth area neighboring the lower side of the second area and the right of the third area (S213).

The first, second, third and fourth area images extracted as described above include distance distortion and wide-angle distortion. Accordingly, the distortion calibration unit calibrates the wide-angle distortion and distance distortion of each of the first, second, third and fourth area images with reference to a distortion constant (S220, S221, S222, and S223).

Figure 21:
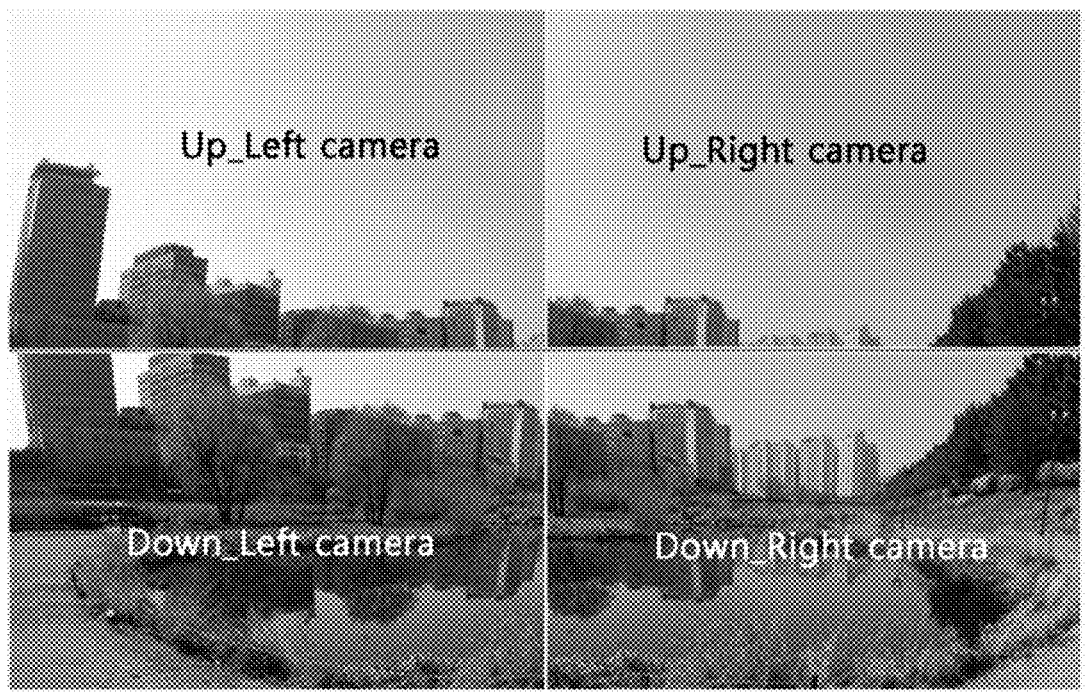
FIGS. 21 to 25 are diagrams for describing a process of calibrating first, second, third and fourth area images, for describing the method of providing a wide-angle image according to another embodiment of the present invention.

FIG. 21 shows the first, second, third and fourth area images whose wide-angle distortion and distance distortion have been calibrated as described above.

Figure 22:
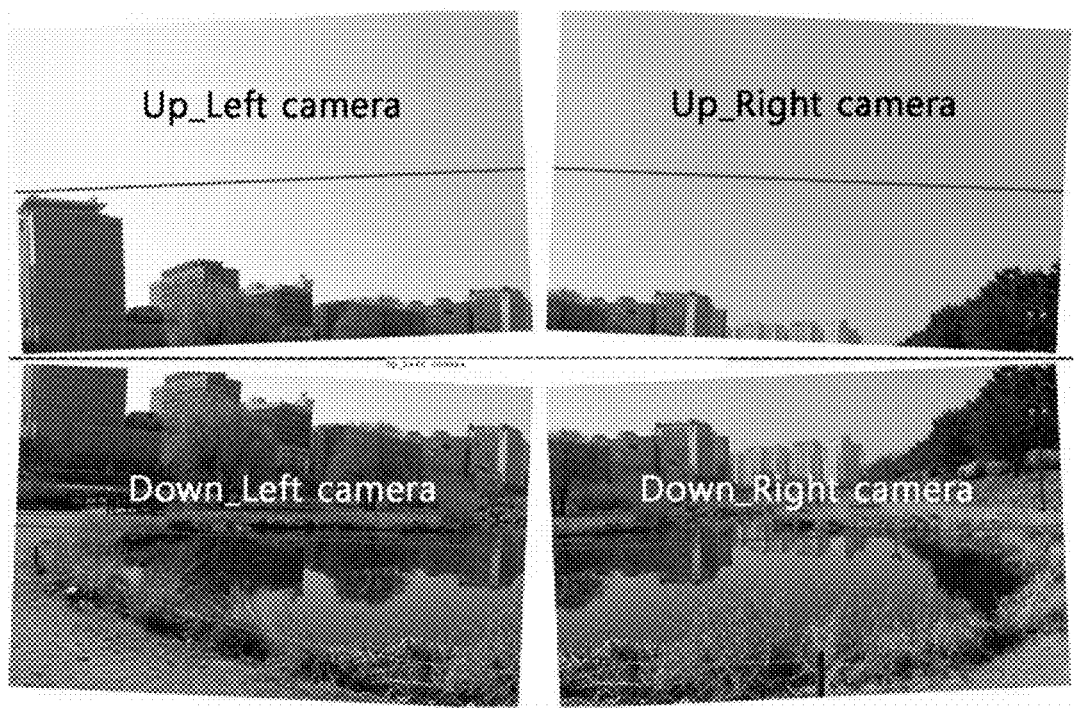

Thereafter, the phase difference calibration unit extracts the horizontal reference point of the first, second, third and fourth area images whose wide-angle distortion and distance distortion have been calibrated, with reference to a phase difference constant, and then adjusts the locations of the first, second, third and fourth area images by rotating and moving coordinates as in FIG. 22 (S230).

Figure 23:
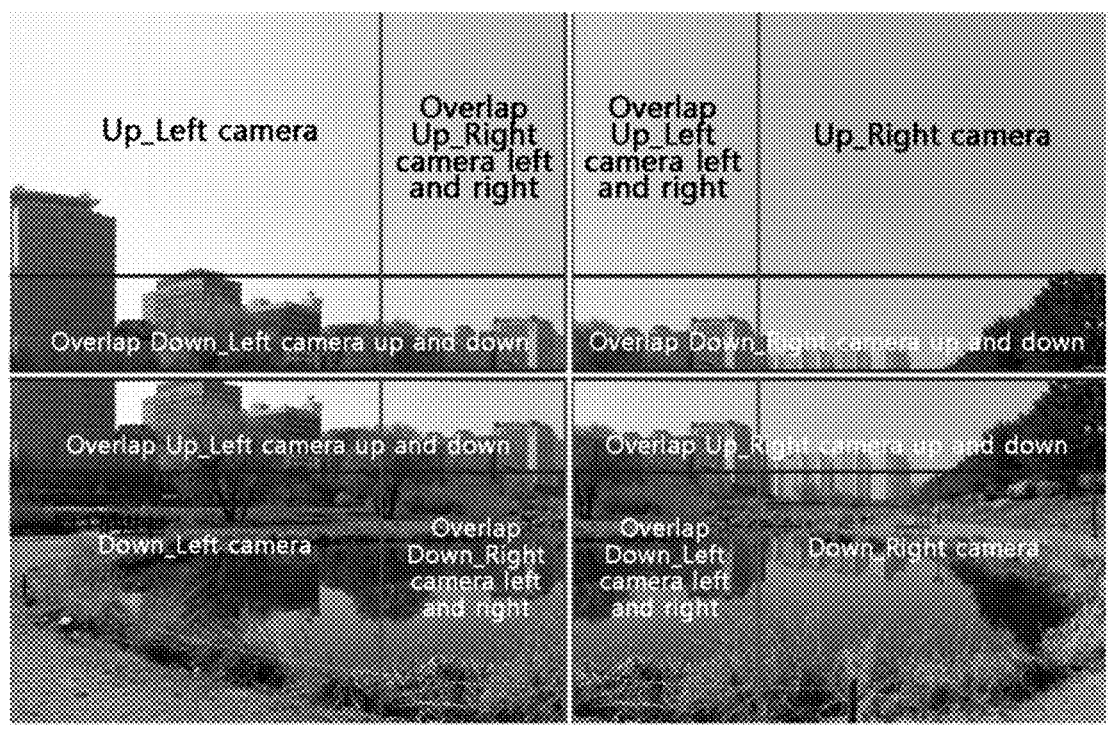

Thereafter, the overlap calibration unit adjusts the sizes of the stored first, second, third and fourth area images with reference to an overlap constant, and then adjusts the locations of the first, second, third and fourth area images so that they overlap as in FIG. 23 by moving the coordinates (S240).

Figure 24:
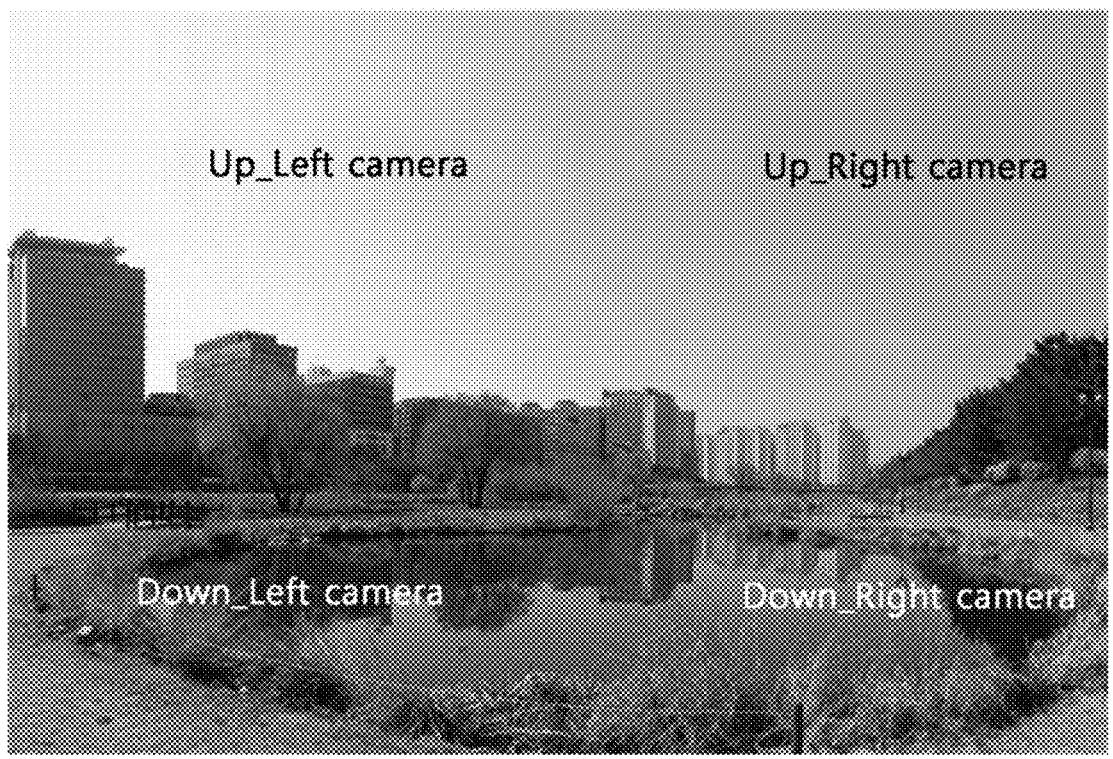
Figure 25:
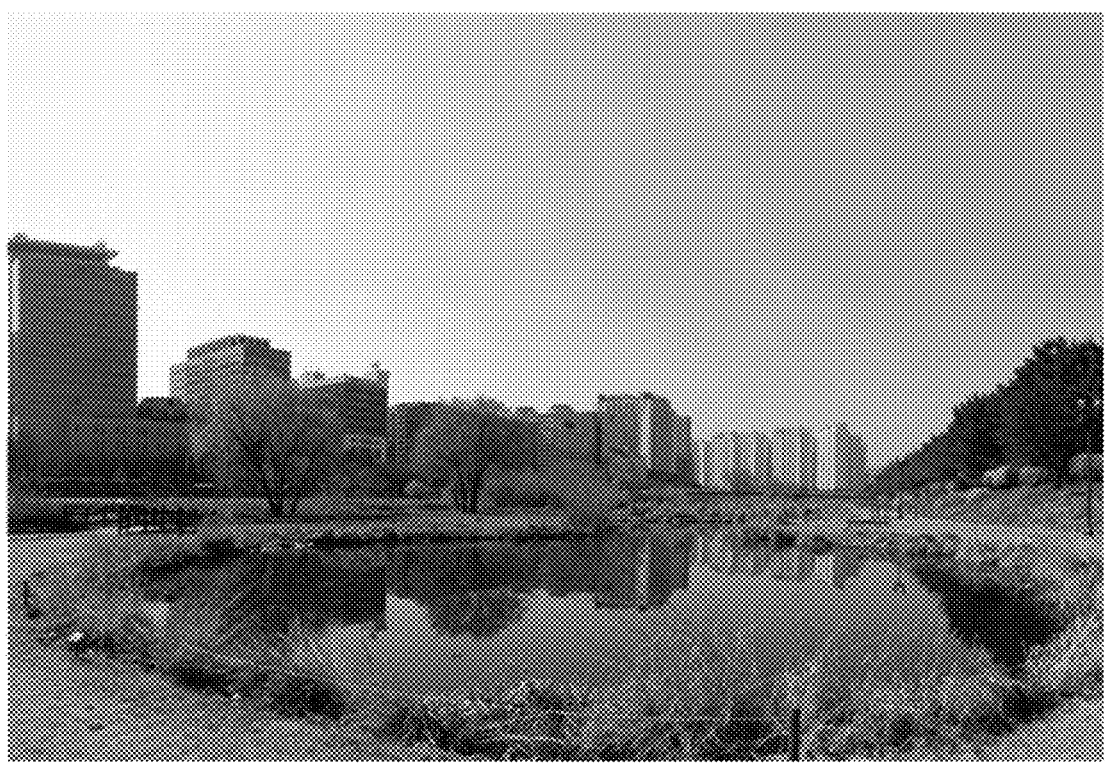

The color calibration unit may generate an image in which the first, second, third and fourth area images are overlapped and composed, as in FIG. 25, by adjusting brightness and chromatic aberration of the superimposed and calibrated overlap image, as shown FIG. 24, with reference to a color constant and store the generated image (S250, S255), and may output the composite image stored as described above (S260).

Figure 26:
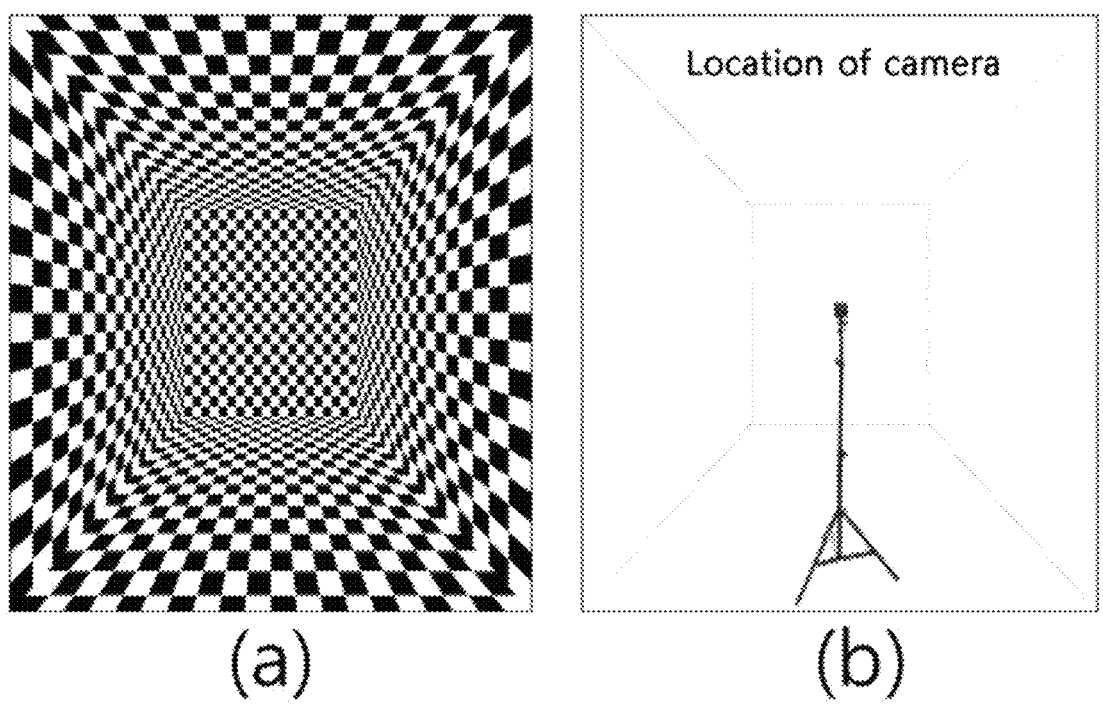
FIGS. 26 to 28 are diagrams showing calibration booths for the calibration of the method of providing a wide-angle image according to another embodiment of the present invention.
Figure 27:
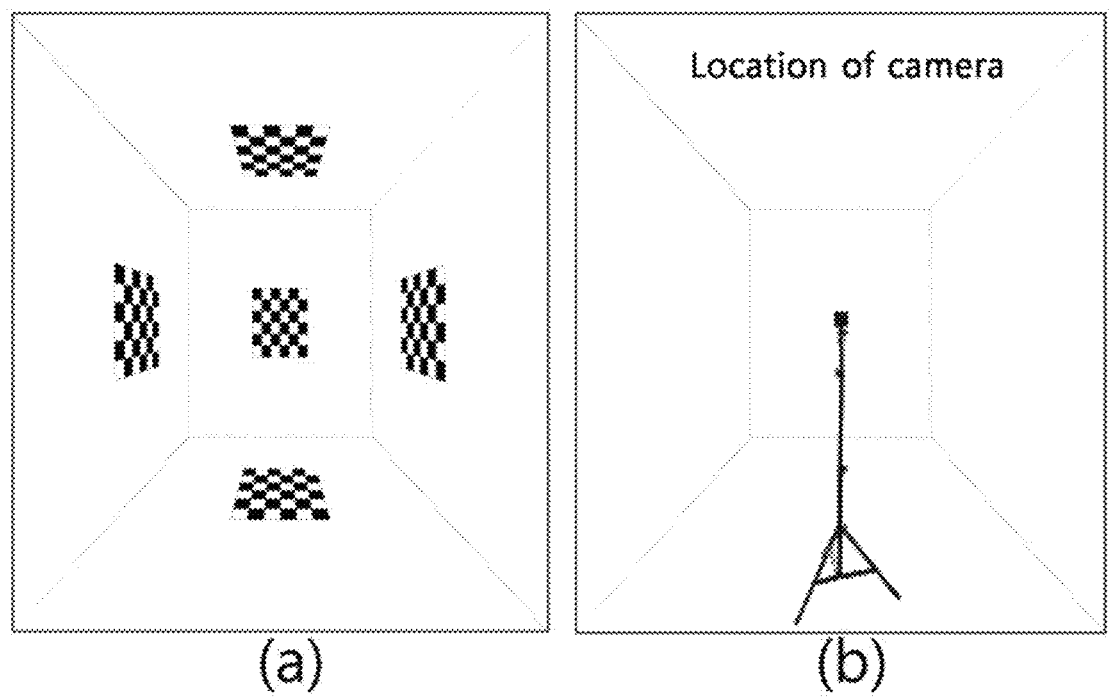
Figure 28:
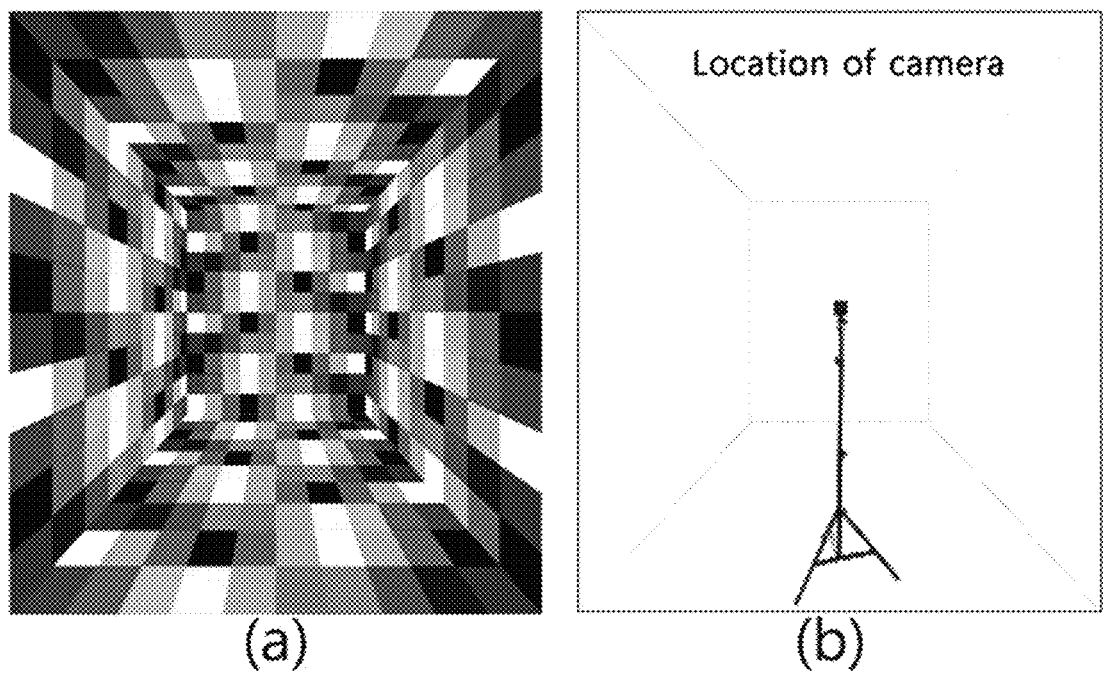

FIGS. 26 to 28 are diagrams showing calibration booths for the calibration of the method of providing a wide-angle image according to another embodiment of the present invention.

FIG. 26 shows a calibration booth for calibrating wide-angle distortion and distance distortion according to another embodiment of the present invention. FIG. 27 shows a calibration booth for calibrating an overlap image according to another embodiment of the present invention.

Furthermore, FIG. 28 shows a calibration booth for calibrating brightness and chromatic aberration of an area image according to another embodiment of the present invention.

Accordingly, according to another embodiment of the present invention, a wide-angle image not having a blind spot and not having wide-angle distortion, distance distortion, an intensity difference and chromatic aberration can be provided. An image can be output in a VR form by providing a wide-angle image not having distortion. Distortion does not occur even when an image is reduced or enlarged.

Moreover, according to another embodiment of the present invention, an image having a wide view angle can be provided by applying the image to all industries in which a camera is used, such as a vehicle, a drone, a mobile, the camera, a ship, a rocket, medical treatment, national defense, homes, and leisure.

Figure 29:
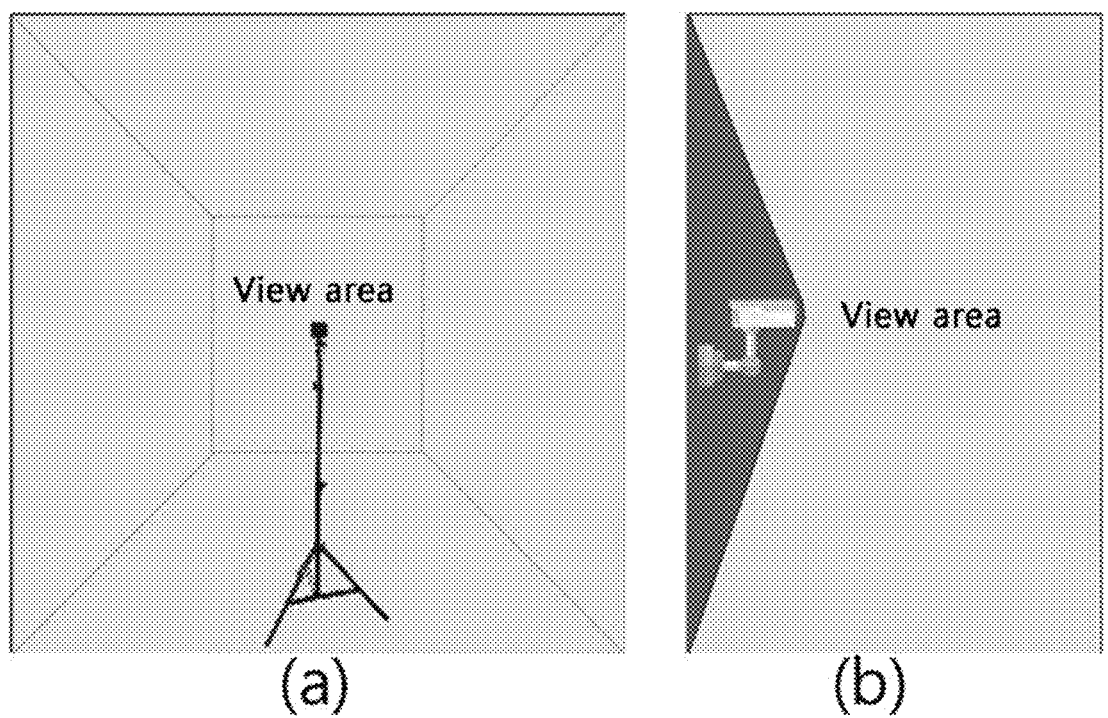
FIG. 29 is a diagram showing photographing deployment angles of first, second, third and fourth cameras according to places where the first, second, third and fourth cameras are disposed according to another embodiment of the present invention.

FIG. 29 is a diagram showing photographing deployment angles of the first, second, third and fourth cameras according to places where the first, second, third and fourth cameras are disposed according to another embodiment of the present invention.

Hereinafter, photographing angles of the first, second, third and fourth cameras according to the deployment of the first, second, third and fourth cameras according to another embodiment of the present invention are described with reference to FIG. 29.

According to another embodiment of the present invention, as in FIG. 29($a$), the first, second, third and fourth cameras may provide a front image having a wide view angle of left and right 200° and up and down 200° without a blind spot.

Furthermore, as in FIG. 29($b$), if the first, second, third and fourth cameras are disposed on the side vertically upright from the ground, such as a wall surface, they may photograph and provide an image of areas other than a corresponding side (wall surface).

Figure 30:
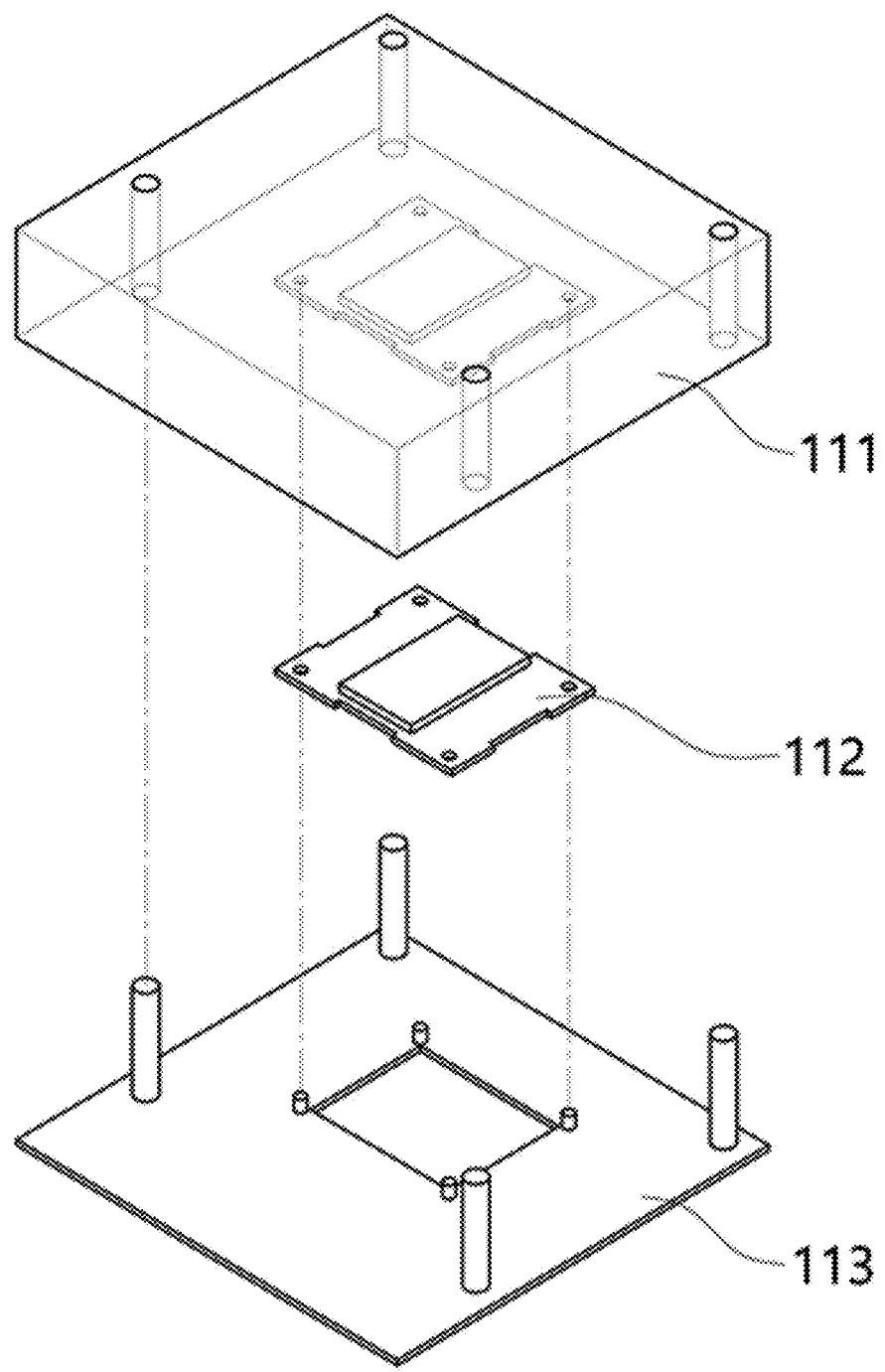
FIG. 30 is a perspective view of a camera module of the system for providing a wide-angle image according to another embodiment of the present invention.
Figure 31:
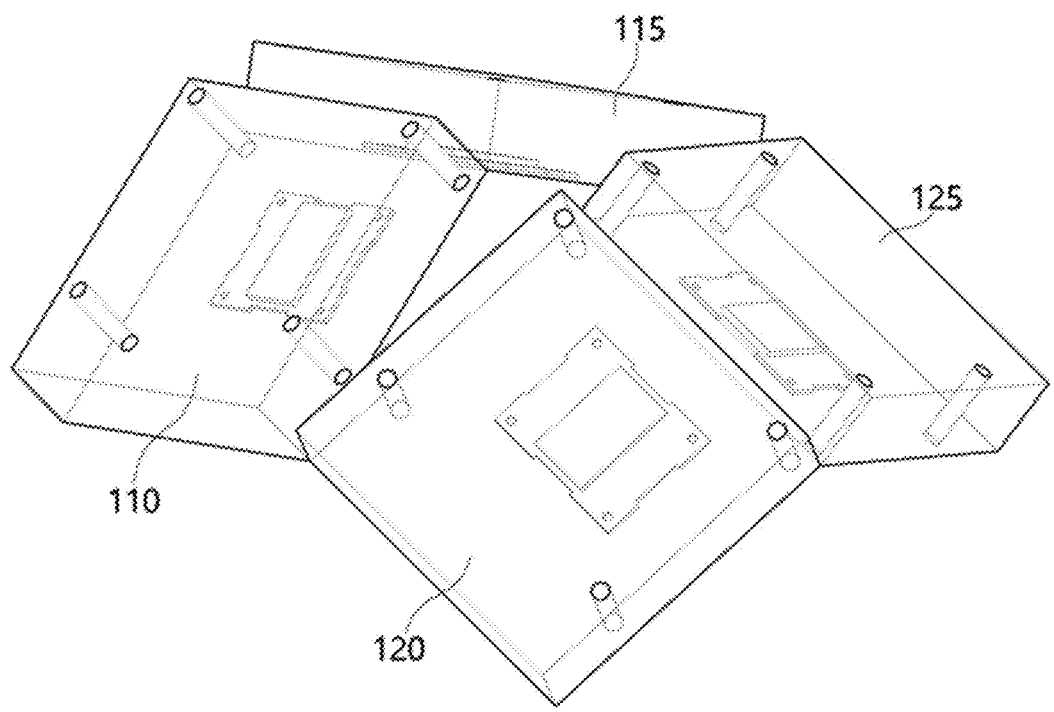
FIG. 31 is a development figure of the camera module of the system for providing a wide-angle image according to another embodiment of the present invention.

FIG. 30 is a perspective view of a camera module of the system for providing a wide-angle image according to another embodiment of the present invention. FIG. 31 is a development figure of the camera module of the system for providing a wide-angle image according to another embodiment of the present invention.

Referring to FIG. 30, each of first, second, third and fourth camera modules 110, 115, 120, and 125 according to another embodiment of the present invention may be configured to include a lens module 111, an image sensor module 112 and a structure 113.

The image sensor module 112 generates an area image of a corresponding area photographed through the lens module 111. The structure 113 may be configured to receive the lens module 111 and the image sensor module 112.

In this case, the structure 113 may be configured using an aluminum frame in order to reduce weight.

$$\alpha = (180° - a) \times (\tfrac{2}{3}) \qquad \text{[Equation 3]}$$

(In this case, $\alpha$ is an angle between the first, second, third and fourth camera modules, and a is an horizontal view angle of the first, second, third and fourth camera modules)

$$\beta = (180° - b) \times (\tfrac{1}{3}) \qquad \text{[Equation 4]}$$

(In this case, $\beta$ is an angle of the image module of each of the first, second, third and fourth camera modules, and b is a vertical view angle of the first, second, third and fourth camera modules)

According to an embodiment of the present invention, as shown in FIG. 31, in order to deploy the first, second, third and fourth camera modules 110, 115, 120, and 125, angles between the first, second, third and fourth camera modules 110, 115, 120, and 125 may be calculated using Equation 3. An angle of the image module 112 of each of the first, second, third and fourth camera modules 110, 115, 120, and 125 may be calculated using Equation 4 and disposed.

Hereinafter, the configuration of the system for providing a wide-angle image according to still another embodiment of the present invention is described with reference to FIG. 19.

As shown FIG. 19, the system for providing a wide-angle image according to still another embodiment of the present invention may be configured to include the first camera module 110, the second camera module 115, the third camera module 120, the fourth camera module 125, the calibration processor 130 and the image storage unit 140. Furthermore, the calibration processor 130 may be configured to include the distortion calibration unit 131, the phase difference calibration unit 132, the overlap calibration unit 133 and the color calibration unit 134.

The first camera module 110 generates a first area image of a first area. The second camera module 115 generates a second area image of a second area neighboring the right of the first area. The third camera module 120 generates a third area image of a third area, that is, the opposite side of the first area. The fourth camera module 125 generates a fourth area image of a fourth area that is the opposite side of the second area and that neighbors the left of the third area.

More specifically, the first camera module 110 may generate the first area image, that is, a front left image, by photographing an area corresponding to the front left. The second camera module 115 may generate the second area image, that is, a front right image, by photographing an area corresponding to the front-up. Likewise, the third camera module 120 may generate the third area image, that is, a back left image, by photographing an area corresponding to the back left. The fourth camera module 125 may generate the fourth area image, that is, a back right image, by photographing an area corresponding to the back right.

The images photographed by the first, second, third and fourth camera modules 110, 115, 120, and 125 as described above include wide-angle distortion and distance distortion. If images captured by four cameras are overlapped to neighbor each other, a phase difference, an overlap area, an intensity difference or chromatic aberration occurs.

Accordingly, the calibration processor 130 calibrates the distortion, phase difference, overlap area, intensity difference or chromatic aberration of the images as described above. That is, the calibration processor 130 calibrates the distortion and phase difference of each of the first, second, third and fourth area images photographed by the first, second, third and fourth camera modules 110, 115, 120, and 125, and performs overlap calibration and color calibration on the first, second, third and fourth area images whose phase differences have been calibrated.

More specifically, the calibration processor 130 may be configured to include the distortion calibration unit 131, the phase difference calibration unit 132, the overlap calibration unit 133 and the color calibration unit 134.

The distortion calibration unit 131 calibrates the distortion of the first, second, third and fourth area images. The phase difference calibration unit 132 calibrates the phase difference of each of the first, second, third and fourth area images whose distortion has been calibrated. Furthermore, the overlap calibration unit 133 calibrates the first, second, third and fourth area images whose phases have been calibrated in an overlap manner so that the first, second, third and fourth area images neighbor each other. The color calibration unit 134 may calibrate a color of the superimposed and calibrated overlap image.

This is more specifically described. The distortion calibration unit 131 may calibrate the wide-angle distortion of each of the first, second, third and fourth area images, and may then calibrate the distance distortion of each of the first, second, third and fourth area images. The phase difference calibration unit 132 may extract the horizontal reference point of the first, second, third and fourth area images, and may then adjust the locations of the first, second, third and fourth area images by rotating and moving coordinates. The overlap calibration unit 133 may adjust the size of each of the first, second, third and fourth area images, and may then adjust the locations of the first, second, third and fourth area images so that they overlap by moving the coordinates. The color calibration unit 134 may adjust brightness and chromatic aberration of the superimposed and calibrated overlap image.

The image storage unit 140 may store an image calibrated and composed by the calibration processor 130 as described above.

Accordingly, according to an embodiment of the present invention, a wide-angle image not having a blind spot and not having wide-angle distortion, distance distortion, an intensity difference and chromatic aberration can be provided.

FIGS. 32 to 36 are diagrams for describing a process of calibrating first, second, third and fourth area images, for describing a method of providing a wide-angle image according to still another embodiment of the present invention.

Hereinafter, the method of providing a wide-angle image according to still another embodiment of the present invention is described with reference to FIG. 20 and FIGS. 32 to 36.

First, as shown in FIG. 20, the first camera module corresponding to an up-left camera generates and extracts a first area image of a first area (S210). The second camera module corresponding to an up-right camera generates and extracts a second area image of a second area neighboring the right of the first area (S211).

Furthermore, the third camera module corresponding to a back left camera generates and extracts a third area image of a third area (S212). The fourth camera module corresponding to a back right camera generates and extracts a fourth area image of a fourth area neighboring the lower side of the second area and the right of the third area (S213).

The first, second, third and fourth area images extracted as described above include distance distortion and wide-angle distortion. Accordingly, the distortion calibration unit calibrates the wide-angle distortion and distance distortion of each of the first, second, third and fourth area images with reference to a distortion constant (S220, S221, S222, and S223).

Figure 32:
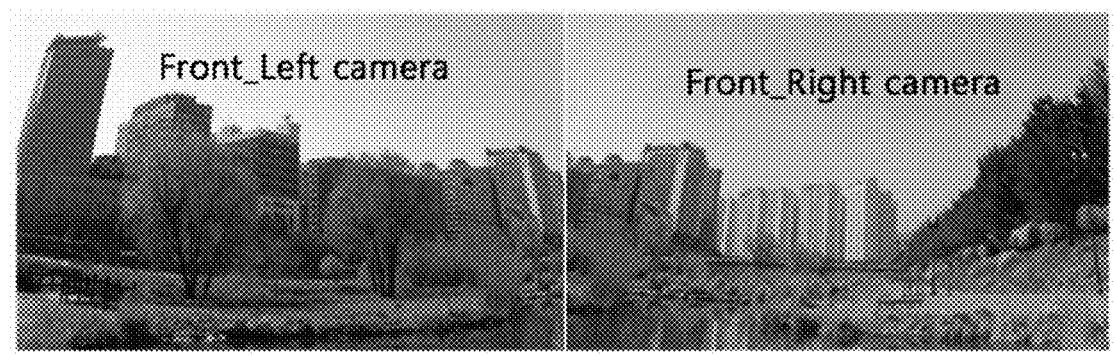
FIGS. 32 to 36 are diagrams for describing a process of calibrating first, second, third and fourth area images, for describing a method of providing a wide-angle image according to still another embodiment of the present invention.

FIG. 32 shows the first and second area images whose wide-angle distortion and distance distortion have been calibrated as described above.

Figure 33:
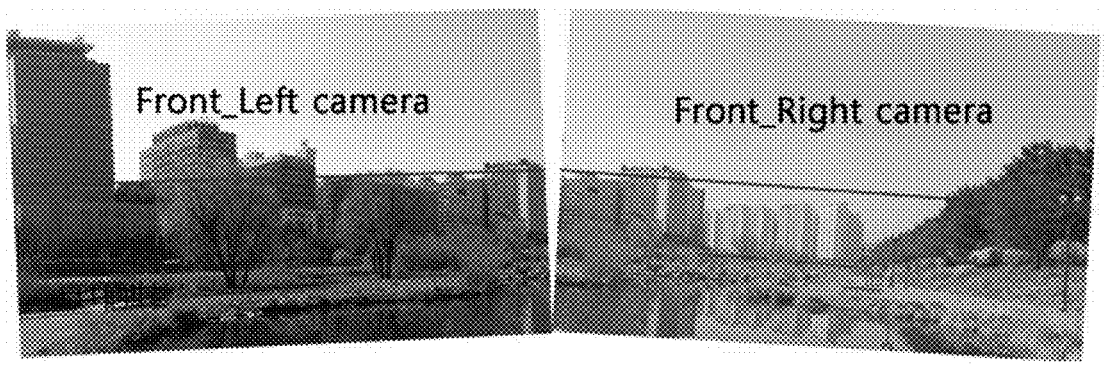

Thereafter, the phase difference calibration unit extracts the horizontal reference point of the first, second, third and fourth area images whose wide-angle distortion and distance distortion have been calibrated, with reference to a phase difference constant, and then adjusts the locations of the first and second area images by rotating and moving coordinates as in FIG. 33. Likewise, the phase difference calibration unit also adjusts the locations of the third and fourth area images (S230).

Figure 34:
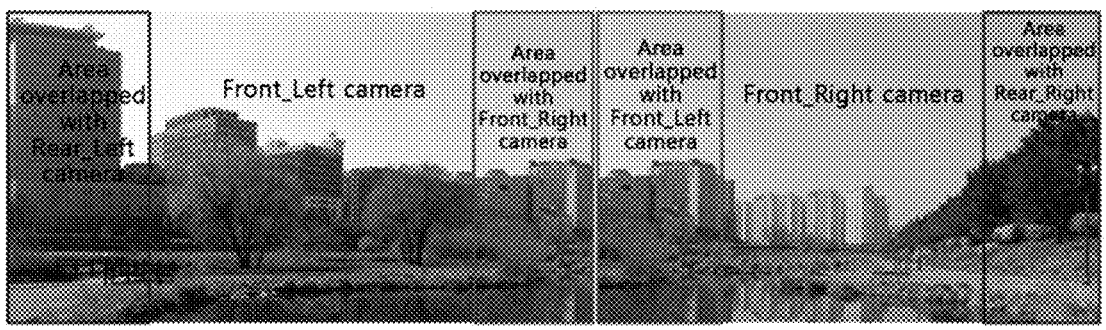

Thereafter, the overlap calibration unit adjusts the sizes of the stored first, second, third and fourth area images with reference to an overlap constant, and then adjusts the locations of first, second, third and fourth area images as in FIG. 34 by moving coordinates (S240).

Figure 35:
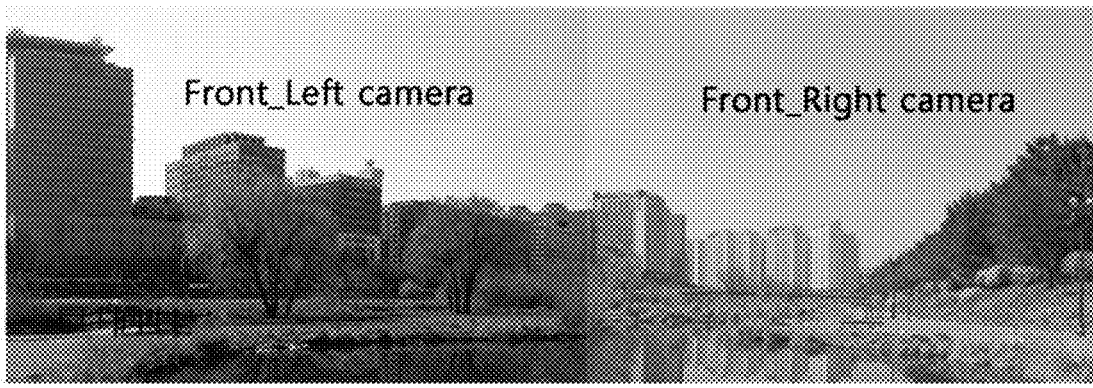
Figure 36:
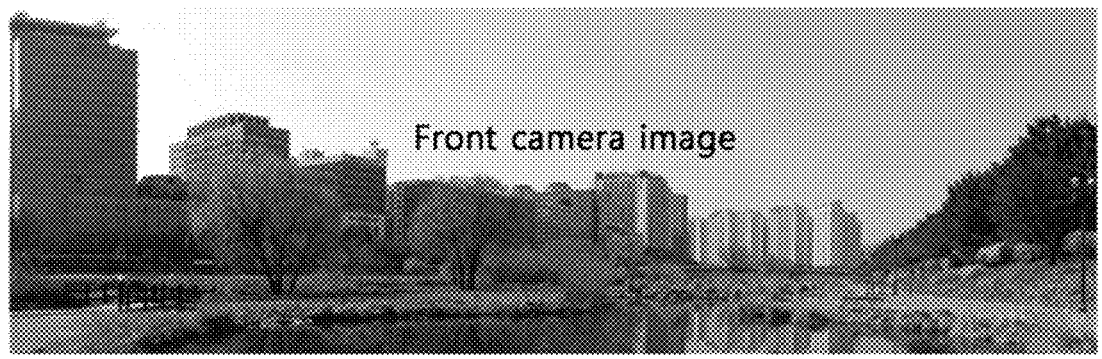

The color calibration unit may adjust brightness and chromatic aberration of the superimposed and calibrated overlap image with reference to a color constant, as shown FIG. 35, may generate and store an image in which the first, second, third and fourth area images are overlapped and composed as in FIG. 36 (S250, S255), and may output the composite image stored as described above (S260).

Figure 37:
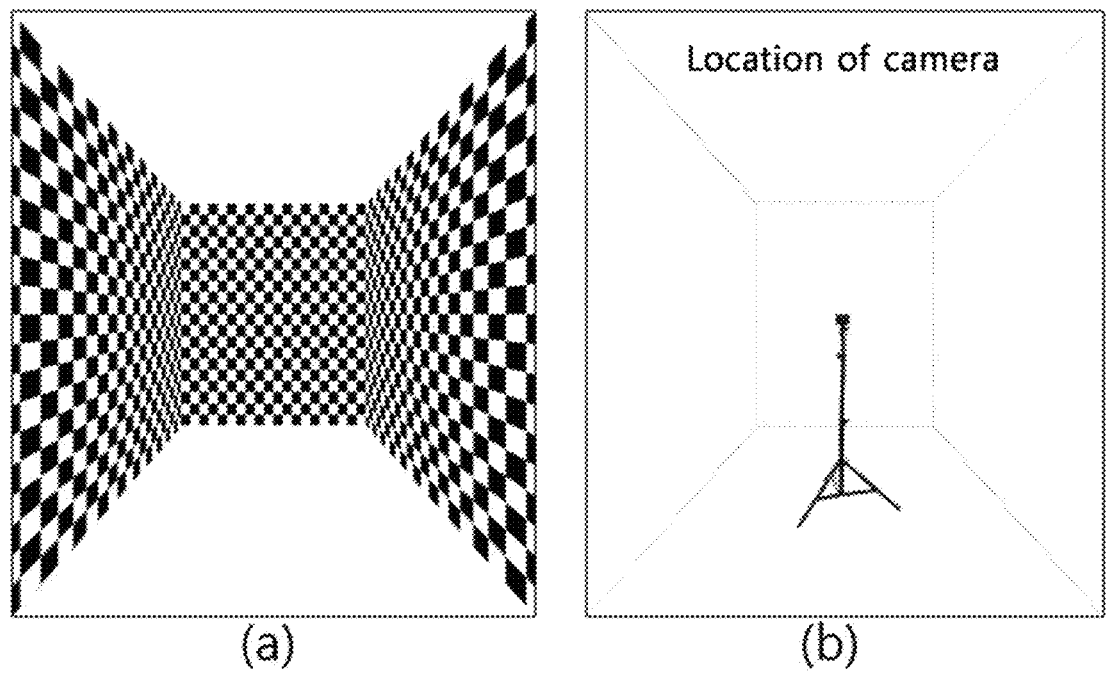
FIGS. 37 to 39 are diagrams showing calibration booths for the calibration of the method of providing a wide-angle image according to still another embodiment of the present invention.
Figure 38:
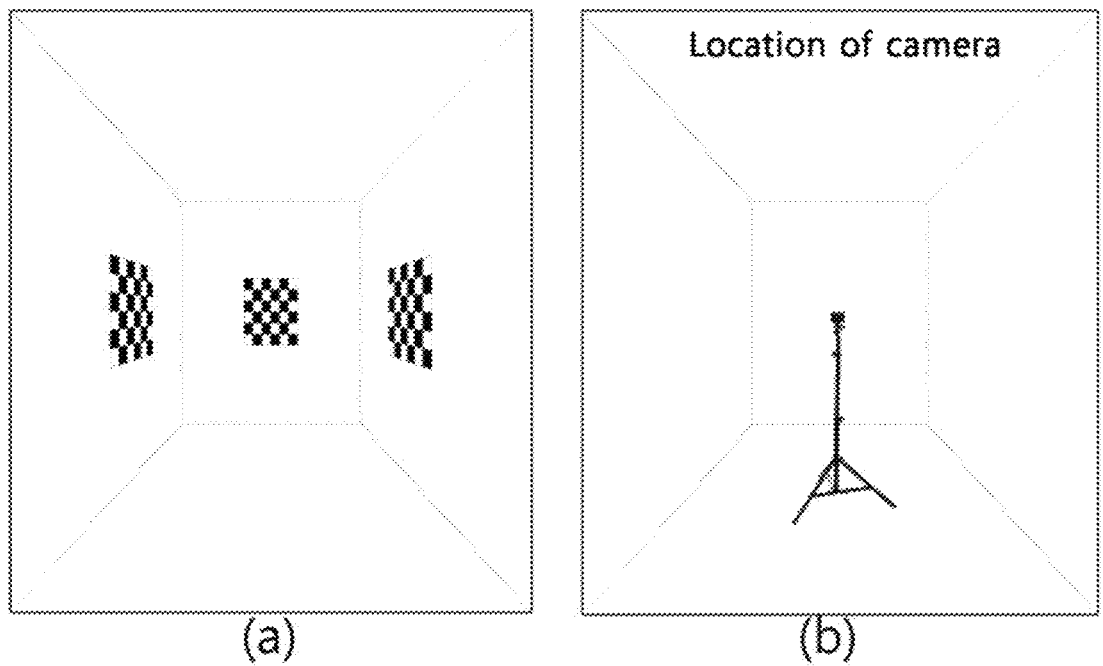
Figure 39:
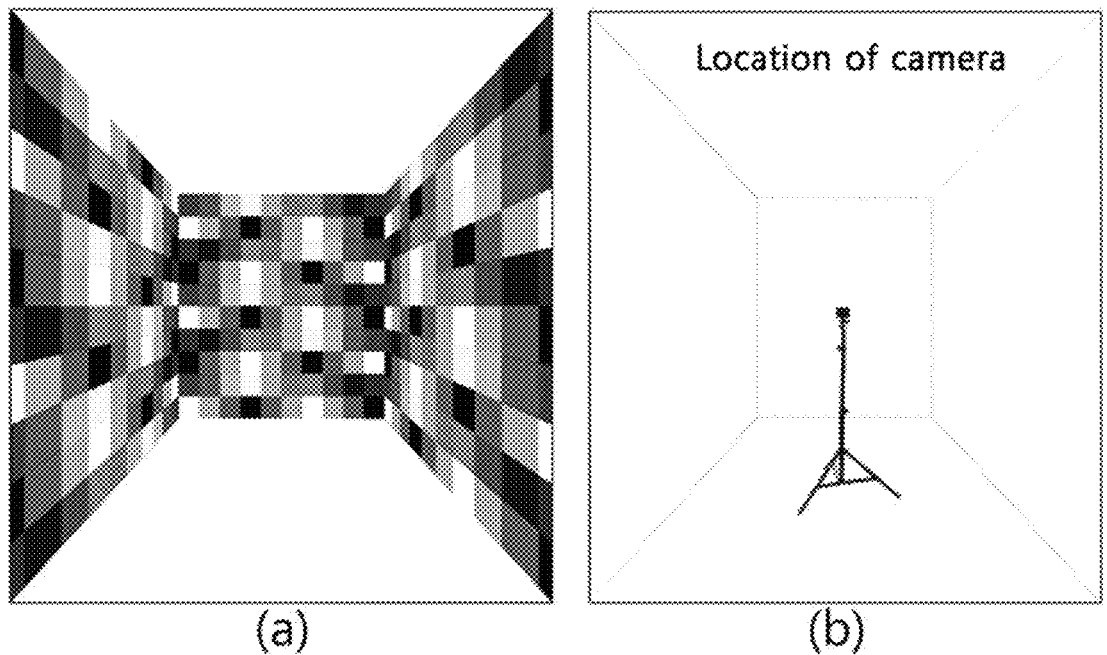

FIGS. 37 to 39 are diagrams showing calibration booths for the calibration of the method of providing a wide-angle image according to still another embodiment of the present invention.

FIG. 37 shows a calibration booth for calibrating wide-angle distortion and distance distortion according to an embodiment of the present invention. FIG. 38 shows a calibration booth for calibrating an overlap image according to an embodiment of the present invention.

Furthermore, FIG. 39 shows a calibration booth for calibrating brightness and chromatic aberration of an area image according to an embodiment of the present invention.

Accordingly, according to an embodiment of the present invention, a wide-angle image not having a blind spot and not having wide-angle distortion, distance distortion, an intensity difference and chromatic aberration can be provided. An image can be output in a VR form by providing a wide-angle image not having distortion. Distortion does not occur even when an image is reduced or enlarged.

Moreover, according to an embodiment of the present invention, an image having a wide view angle can be provided by applying the image to all industries in which a camera is used, such as a vehicle, a drone, a mobile, the camera, a ship, a rocket, medical treatment, national defense, homes, and leisure.

Figure 40:
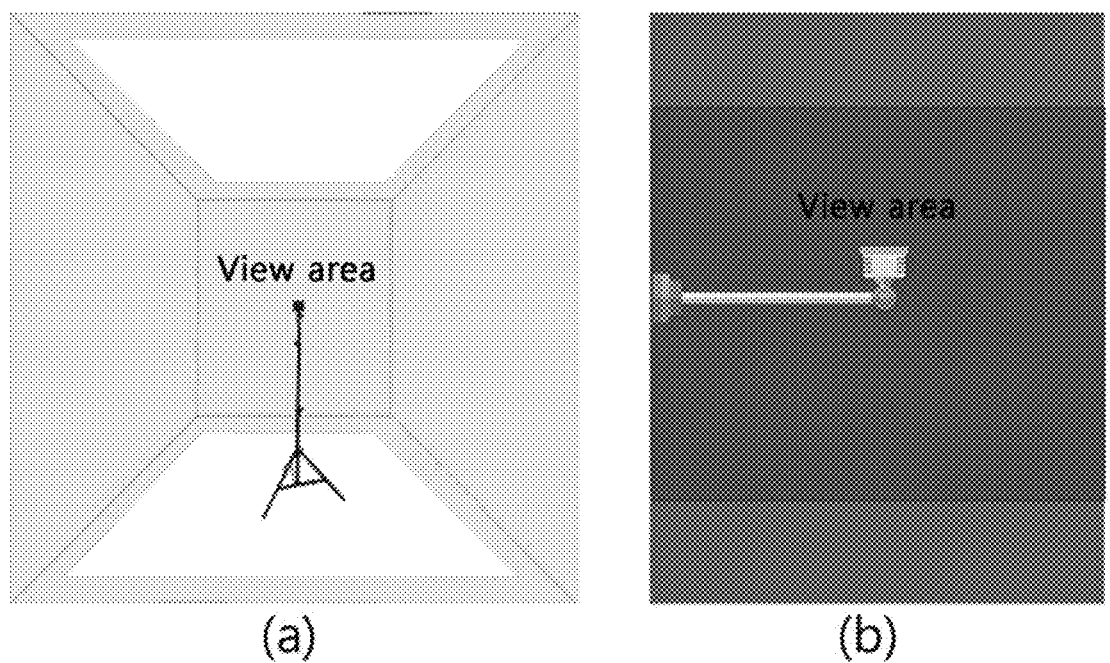
FIG. 40 is a diagram showing photographing deployment angles of first, second, third and fourth cameras according to places where the first, second, third and fourth cameras are disposed according to still another embodiment of the present invention.

FIG. 40 is a diagram showing photographing deployment angles of first, second, third and fourth cameras according to places where the first, second, third and fourth cameras are disposed according to still another embodiment of the present invention.

Hereinafter, photographing angles of the first, second, third and fourth cameras according to the deployment of the first, second, third and fourth cameras according to an embodiment of the present invention are described with reference to FIG. 40.

As in FIG. 40(a), the first, second, third and fourth cameras may provide a front image having a wide view angle of left and right 360° and up and down 90°~100° without a blind spot in an area other than a floor and a ceiling.

Furthermore, as in FIG. 40(b), if the first, second, third and fourth cameras are disposed on the side vertically upright from the ground, such as a wall surface, they may photograph and provide an image of an area other than the floor and the ceiling.

Figure 41:
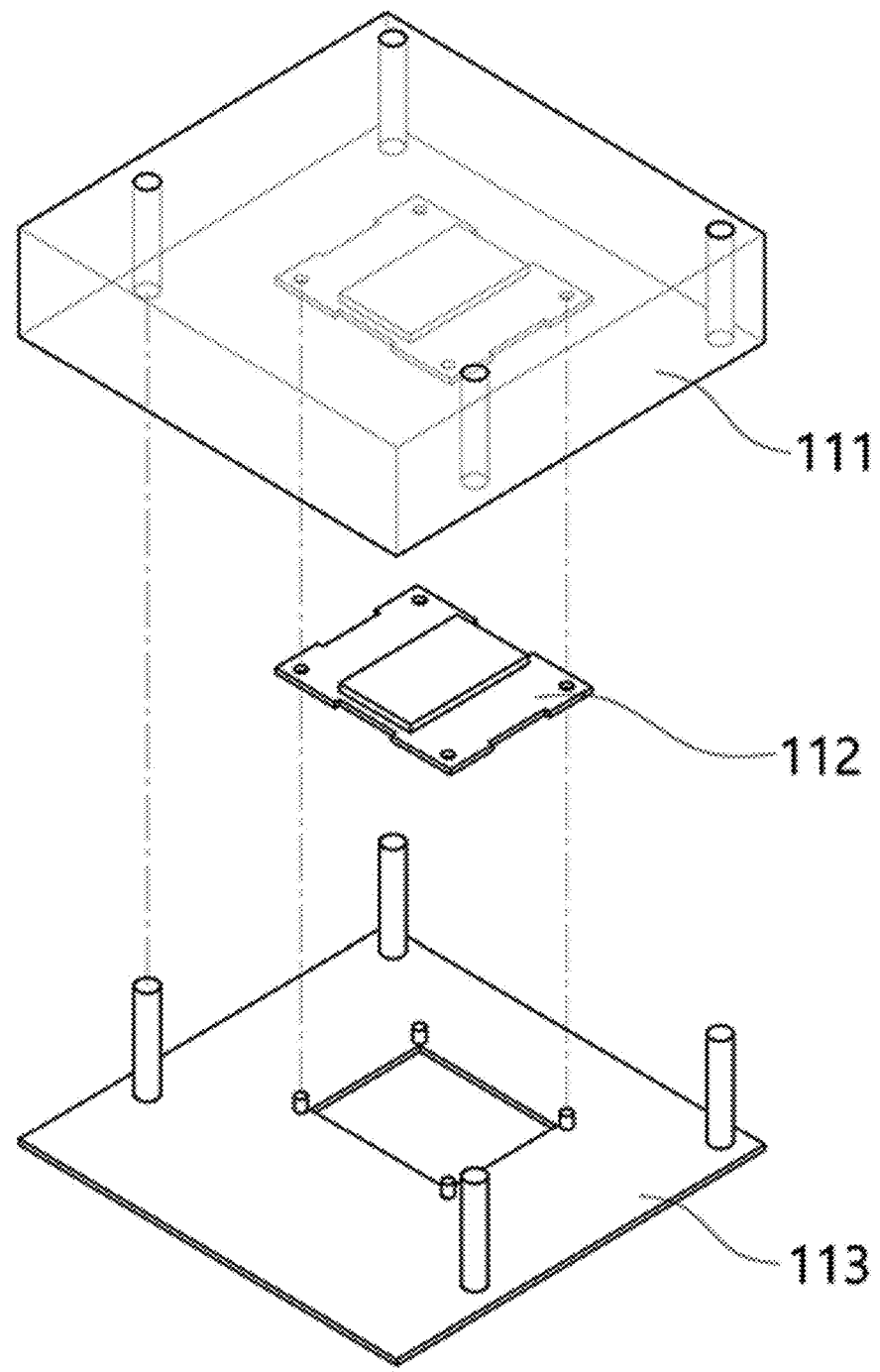
FIG. 41 shows a configuration of a camera module of a system for providing a wide-angle image according to still another embodiment of the present invention.
Figure 42:
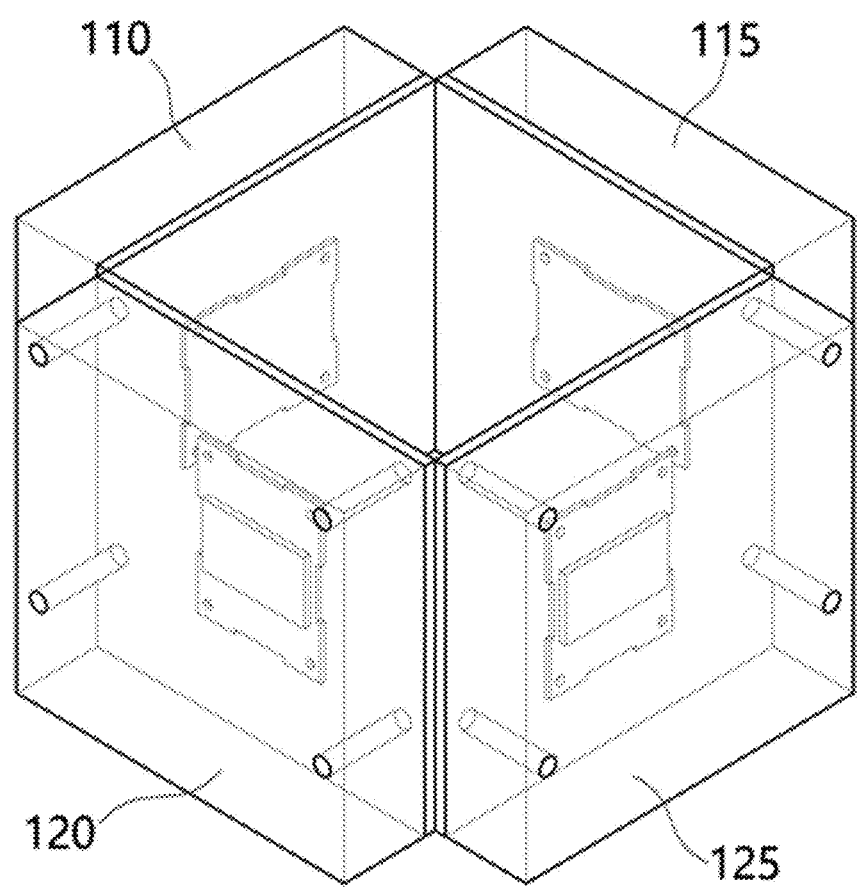
FIG. 42 is a perspective view of the camera module of the system for providing a wide-angle image according to still another embodiment of the present invention.

FIG. 41 shows a configuration of a camera module of a system for providing a wide-angle image according to still another embodiment of the present invention. FIG. 42 is a perspective view of the camera module of the system for providing a wide-angle image according to still another embodiment of the present invention.

Figure 43:
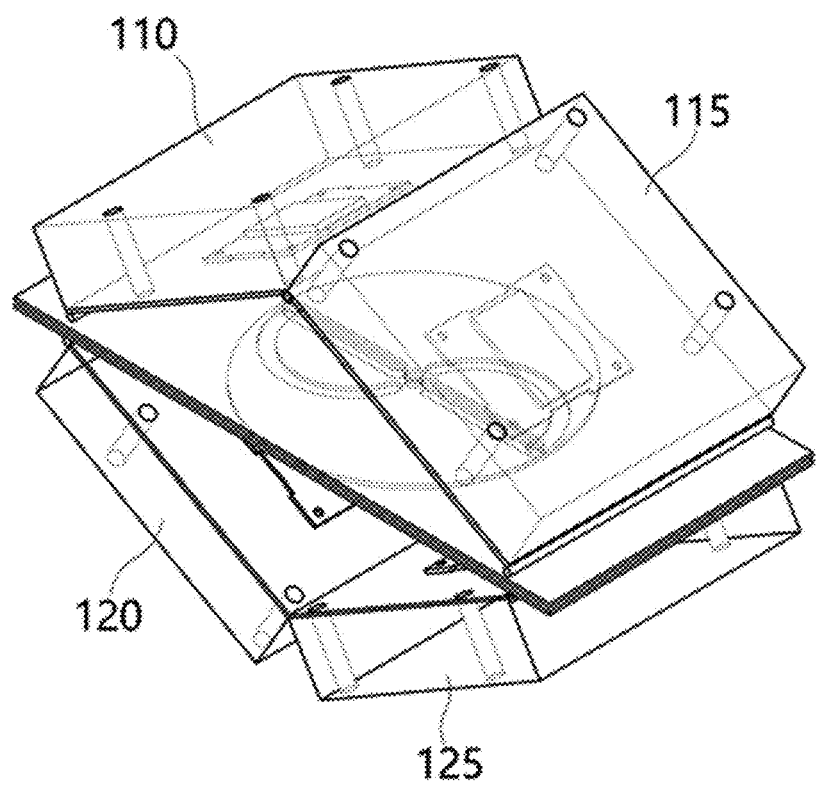
FIG. 43 is a diagram for describing a method of adjusting an angle of the camera module of the system for providing a wide-angle image according to still another embodiment of the present invention.
Figure 44:
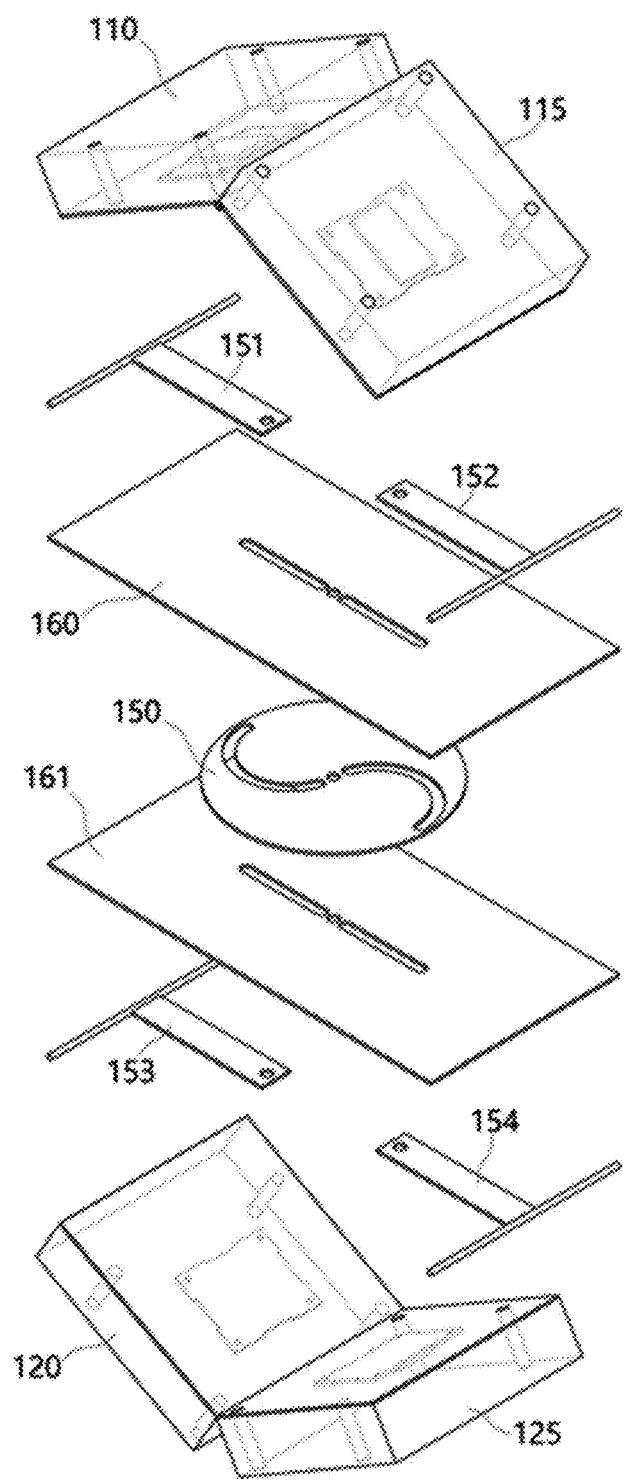
FIG. 44 is a development figure of the camera module of the system for providing a wide-angle image according to still another embodiment of the present invention.

Furthermore, FIG. 43 is a diagram for describing a method of adjusting an angle of the camera module of the system for providing a wide-angle image according to still another embodiment of the present invention. FIG. 44 is a development figure of the camera module of the system for providing a wide-angle image according to still another embodiment of the present invention.

Referring to FIGS. 41 and 42, each of first, second, third and fourth camera modules 110, 115, 120, and 125 according to an embodiment of the present invention may be configured to include a lens module 111, an image sensor module 112 and a structure 113.

The image sensor module 112 generates an area image of a corresponding area photographed through the lens module 111. The structure 113 may be configured to receive the lens module 111 and the image sensor module 112.

In this case, the structure 113 may be configured using an aluminum frame in order to reduce weight. A fixed type system for providing a wide-angle image according to an embodiment of the present invention may be configured as a square photographing system in which the first, second, third and fourth camera modules 110, 115, 120, and 125 are disposed at four faces and perform photographing of 360°.

Furthermore, as in FIGS. 43 and 44, each of the first and second link units 151 and 152 may be coupled to one side of each of the first and second camera modules 110 and 115. Likewise, each of the third and fourth link units 153 and 154 may be coupled to one side of each of the third and fourth camera modules 120 and 125. The circular plate 150 is fixed between the fixing plates 160 and 161, and may be configured to be rotated by a motor.

Furthermore, the circular plate 150 may be configured to include curve grooves where the first, second, third and fourth link units 151, 152, 153 and 154 are coupled and moved.

Accordingly, the first and second camera modules 110 and 115 each are configured to have the other side, facing the one side, mutually coupled by hinges. The first and second link units 151 and 152 may move in the curve grooves by the rotation of the circular plate 150. Likewise, the third and fourth camera modules 120 and 125 each are configured to have the other side, facing the one side, mutually coupled by hinges. The third and fourth link units 153 and 154 may move in the curve grooves by the rotation of the circular plate 150.

Accordingly, according to an embodiment of the present invention, angles formed by the first, second, third and fourth camera modules 110, 115, 120, and 125 may be adjusted by the rotation of the circular plate 150.

When the angles between the first, second, third and fourth camera modules 110, 115, 120, and 125 are adjusted, the angles between the first, second, third and fourth camera modules 110, 115, 120, and 125 may be adjusted by rotating the circular plate 150 through control of the motor, and an optimum image photographing range can be obtained through zoom-in and zoom-out.

According to the present invention, angles of the first, second, third and fourth camera modules 110, 115, 120, and 125 may be determined based on view angles of the first, second, third and fourth camera modules 110, 115, 120, and 125.

$$\alpha = (180° - a) \times (2/3) \qquad \text{[Equation 5]}$$

(In this case, $\alpha$ is an angle between the first, second, third and fourth camera modules, and a is a horizontal view angle of the first, second, third and fourth camera modules)

$$\beta = (180° - b) \times (1/3) \qquad \text{[Equation 6]}$$

(In this case, β is an angle of the image module of each of the first, second, third and fourth camera modules, and b is a vertical view angle of the first, second, third and fourth camera modules)

According to an embodiment of the present invention, as shown in FIG. 43, in order to deploy the first, second, third and fourth camera modules 110, 115, 120, and 125, angles between the first, second, third and fourth camera modules 110, 115, 120, and 125 may be calculated using Equation 1. An angle of the image module 112 of each of the first, second, third and fourth camera modules 110, 115, 120, and 125 may be calculated using Equation 2 and disposed.

In the detailed description of the present disclosure, such as that described above, detailed embodiments have been described. However, the present disclosure may be modified in various ways without departing from the category of the present disclosure. Accordingly, the technical spirit of the present disclosure should not be limited to the aforementioned embodiments, but should be defined by not only the appended claims, but equivalents thereof.

The invention claimed is:

1. A method of providing a wide-angle image, comprising:
a photographing step of generating, by a first camera module, a first area image of a first area and generating, by a second camera module, a second area image of a second area neighboring the first area,
wherein the first and second camera modules are disposed based on an angle (α) from Equation 1 and an angle (β) from Equation 2, $$\alpha = (180° - a) \times (2/3) \qquad \text{Equation 1}$$

wherein α is the angle formed by each of the first and second camera modules and a floor surface, wherein a is a horizontal view angle of the first and second camera modules, $$\beta = (180° - b) \times (1/3) \qquad \text{Equation 2}$$

wherein β is the angle of an image module of each of the first and second camera modules, wherein b is a vertical view angle of each of the first and second camera modules;
a distortion calibration step of calibrating, by a distortion calibration unit, distortion of each of the first and second area images;
a phase difference calibration step of calibrating, by a phase difference calibration unit, a phase difference between the first and second area images whose distortion has been calibrated;
an overlap calibration step of calibrating, by an overlap calibration unit, the first and second area images whose phases have been calibrated in an overlap manner so that the first and second area images neighbor each other; and
a color calibration step of calibrating, by a color calibration unit, a color of the superimposed and calibrated first and second images.

2. The method of claim 1, wherein:
the distortion calibration step comprises calibrating, by the distortion calibration unit, wide-angle distortion of each of the first and second area images and then calibrating distance distortion,
the phase difference calibration step comprises extracting, by the phase difference calibration unit, a horizontal reference point of the first and second area images and then adjusting locations of the first and second area images by rotating and moving coordinates,
the overlap calibration step comprises adjusting, by the overlap calibration unit, a size of each of the first and second area images and then adjusting locations of the first and second area images so that the first and second area images are superimposed by moving the coordinates, and
the color calibration step comprises calibrating, by the color calibration unit, brightness and chromatic aberration of the superimposed and calibrated overlap image.

3. A method of providing a wide-angle image, comprising:
a photographing step of generating, by a first camera module, a first area image of a first area, generating, by a second camera module, a second area image of a second area neighboring a right of the first area, generating, by a third camera module, a third area image of a third area neighboring a lower side of the first area, and generating, by a fourth camera module, a fourth area image of a fourth area neighboring a lower side of the second area and a right of the third area,
wherein the first, second, third, and fourth camera modules are disposed based on an angle (α) from Equation 1 and an angle (β) from Equation 2, $$\alpha = (180° - a) \times (2/3) \qquad \text{Equation 1}$$

wherein α is the angle formed by each of the first, second, third, and fourth camera modules and a floor surface, wherein a is a horizontal view angle of the first, second, third, and fourth camera modules, $$\beta = (180° - b) \times (1/3) \qquad \text{Equation 2}$$

wherein β is the angle of an image module of each of the first, second, third, and fourth camera modules, wherein b is a vertical view angle of each of the first, second, third, and fourth camera modules;
a distortion calibration step of calibrating, by a distortion calibration unit, distortion of each of the first, second, third and fourth area images;
a phase difference calibration step of calibrating, by a phase difference calibration unit, a phase difference of each of the first, second, third and fourth area images whose distortion has been calibrated;
an overlap calibration step of calibrating, by an overlap calibration unit, the first, second, third and fourth area images whose phases have been calibrated in an overlap manner so that the first, second, third and fourth area images neighbor each other; and
a color calibration step of calibrating, by a color calibration unit, a color of the superimposed and calibrated overlap image.

4. The method of claim 3, wherein:
the distortion calibration step comprises calibrating, by the distortion calibration unit, wide-angle distortion of each of the first, second, third and fourth area images and then calibrating distance distortion,
the phase difference calibration step comprises extracting, by the phase difference calibration unit, a horizontal reference point of the first, second, third and fourth area images and then adjusting locations of the first, second, third and fourth area images by rotating and moving coordinates,
the overlap calibration step comprises adjusting, by the overlap calibration unit, a size of each of the first, second, third and fourth area images and then adjusting locations of the first, second, third and fourth area images so that the first, second, third and fourth area images are superimposed by moving the coordinates, and the color calibration step comprises adjusting, by the color calibration unit, brightness and chromatic aberration of the superimposed and calibrated overlap image.

5. A method of providing a wide-angle image, comprising:

a photographing step of generating, by a first camera module, a first area image of a first area, generating, by a second camera module, a second area image of a second area neighboring a right of the first area, generating, by a third camera module, a third area image of a third area which is an opposite side of the first area, and generating, by a fourth camera module, a fourth area image of a fourth area which is an opposite side of the second area and neighbors a left of the third area, wherein the first, second, third, and fourth camera modules are disposed based on an angle (α) from Equation 1 and an angle (β) from Equation 2, $$\alpha = (180° - a) \times (\tfrac{2}{3})$$ Equation 1 wherein α is the angle formed by each of the first, second, third, and fourth camera modules and a floor surface, wherein a is a horizontal view angle of the first, second, third, and fourth camera modules, $$\beta = (180° - b) \times (\tfrac{1}{3})$$ Equation 2 wherein β is the angle of an image module of each of the first, second, third, and fourth camera modules, wherein b is a vertical view angle of each of the first, second, third, and fourth camera modules;

a distortion calibration step of calibrating, by a distortion calibration unit, distortion of each of the first, second, third and fourth area images;

a phase difference calibration step of calibrating, by a phase difference calibration unit, a phase difference of each of the first, second, third and fourth area images whose distortion has been calibrated;

an overlap calibration step of calibrating, by an overlap calibration unit, the first, second, third and fourth area images whose phases have been calibrated in an overlap manner so that the first, second, third and fourth area images neighbor each other; and a color calibration step of calibrating, by a color calibration unit, a color of the superimposed and calibrated overlap image.

6. The method of claim 5, wherein:

the distortion calibration step comprises calibrating, by the distortion calibration unit, wide-angle distortion of each of the first, second, third and fourth area images and then calibrating distance distortion, the phase difference calibration step comprises extracting, by the phase difference calibration unit, a horizontal reference point of the first, second, third and fourth area images and then adjusting locations of the first, second, third and fourth area images by rotating and moving coordinates, the overlap calibration step comprises adjusting, by the overlap calibration unit, a size of each of the first, second, third and fourth area images and then adjusting locations of the first, second, third and fourth area images so that the first, second, third and fourth area images are superimposed by moving the coordinates, and the color calibration step comprises adjusting, by the color calibration unit, brightness and chromatic aberration of the superimposed and calibrated overlap image.

* * * * *